(12) United States Patent
Vij et al.

(10) Patent No.: US 10,262,392 B2
(45) Date of Patent: *Apr. 16, 2019

(54) DISTRIBUTED AND PARALLELIZED VISUALIZATION FRAMEWORK

(71) Applicant: Kinetica DB, Inc., San Francisco, CA (US)

(72) Inventors: Amit Vij, San Francisco, CA (US); Nima Negahban, Woodbine, MD (US); Eli Glaser, Silver Spring, MD (US); Byungil Jeong, San Ramon, CA (US)

(73) Assignee: KINETICA DB, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,561

(22) Filed: Jul. 17, 2018

(65) Prior Publication Data
US 2018/0322608 A1    Nov. 8, 2018

Related U.S. Application Data

(63) Continuation of application No. 15/878,327, filed on Jan. 23, 2018, now Pat. No. 10,055,808.
(Continued)

(51) Int. Cl.
*G06F 7/08* (2006.01)
*G06F 7/14* (2006.01)
(Continued)

(52) U.S. Cl.
CPC ............... *G06T 1/20* (2013.01); *G06F 7/08* (2013.01); *G06F 7/14* (2013.01);
(Continued)

(58) Field of Classification Search
None
See application file for complete search history.

(56) References Cited

U.S. PATENT DOCUMENTS

2003/0139971 A1* 7/2003 Rescigno ............... G06Q 30/06
                                                                 705/26.62
2010/0169792 A1    7/2010 Ascar et al.
(Continued)

OTHER PUBLICATIONS

PCT International Search Report and Written Opinion dated May 2, 2018 in corresponding PCT Application No. PCT/US2018/014906.

*Primary Examiner* — Frank S Chen
(74) *Attorney, Agent, or Firm* — MH2 Technology Law Group LLP

(57) ABSTRACT

A technique for rendering database data in visualized form using a distributed computer system including a plurality of networked worker nodes each including a graphics processing unit (GPU) is disclosed. The technique includes receiving, at a head node, a user request to render data, forwarding the request to the worker nodes, processing, in parallel, by the worker nodes, chunks of respective shards of data to be rendered. The technique also includes merging, in parallel, by each of the worker nodes, initial images formed by the processing within respective shards, to form a plurality of integrated images, merging, in parallel, respective integrated images to form worker node images, and transmitting respective worker node images to the sink node. The technique also includes merging the worker node images to form a final image, converting the final image to an output image, and providing the output image to the user.

20 Claims, 25 Drawing Sheets

Related U.S. Application Data

(60) Provisional application No. 62/449,513, filed on Jan. 23, 2017.

(51) Int. Cl.
  *G06T 1/20* (2006.01)
  *G06T 1/60* (2006.01)
  *G06F 17/30* (2006.01)
  *H04L 29/08* (2006.01)

(52) U.S. Cl.
  CPC .. *G06F 17/30327* (2013.01); *G06F 17/30339* (2013.01); *G06F 17/30572* (2013.01); *G06T 1/60* (2013.01); *G06T 2210/12* (2013.01); *G06T 2210/36* (2013.01); *H04L 67/12* (2013.01)

(56) References Cited

U.S. PATENT DOCUMENTS

| | | |
|---|---|---|
| 2012/0311587 A1 | 6/2012 | Li et al. |
| 2013/0132684 A1 | 5/2013 | Ostrovsky et al. |
| 2013/0227227 A1 | 8/2013 | Jung et al. |
| 2014/0068498 A1 | 3/2014 | Olsen et al. |
| 2014/0304033 A1 | 10/2014 | Cardno et al. |

* cited by examiner

DISTRIBUTED AND PARALLELIZED VISUALIZATION FRAMEWORK

CROSS-REFERENCE TO RELATED APPLICATIONS

The present application is a continuation of, and claims the benefit of, and priority to, U.S. Utility patent application Ser. No. 15/878,327 filed Jan. 23, 2018, entitled "Distributed and Parallelized Visualization Framework" to Amit Vij and Nima Negahban, which claims the benefit of, and priority to, U.S. Provisional Patent Application No. 62/449,513 filed Jan. 23, 2017, entitled "Distributed Visualization Framework" to Amit Vij and Nima Negahban, the entireties of which are hereby incorporated by reference.

TECHNICAL FIELD

This disclosure relates generally to displaying electronically stored data, particularly large volumes of electronically stored data.

BACKGROUND

Technological advances in memory density and manufacturing over the last 30 years have led to an abundance of relatively cheap, high-capacity memory storage devices. Such an abundance has correspondingly led to an increase in the amount and types of information captured and stored for analysis. For example, satellites capture millions of images of land and terrain from space, Internet servers capture petabytes of information about Internet traffic and patterns, and databases store millions or even billions of records about users, store inventories, or government data.

However, although processing power and speed have also improved during this period, processing nonetheless remains a significant bottleneck to making effective use of valuable stored information. For example, calculations or queries involving more than 5-10 million data records in even the most advanced commercial databases may take hours or even days to complete using standard processing techniques.

One technique for improving computational efficiency has been to increase the number of devices or processors working on a particular calculation or query. For example, many commercially available central processing units (CPUs) now contain multiple processing units, also known as "cores," each of which is capable of executing instructions simultaneously. However, because CPU cores consume significant power and generate significant heat, high-end multicore processors are usually limited to only about ten to twenty cores. As a result, some supercomputing architectures have shifted to utilizing one or more graphics processing units (GPUs) to perform calculations, since GPU cores generally consume less power and may therefore be multiplied to a greater extent in a single chip. For example, currently available high-end GPU chips may include as many as 5000 or more distinct processing cores, at least an order of magnitude larger than CPU chips.

Moreover, CPUs and GPUs typically differ significantly with respect to their threading capabilities. Although both a CPU core and a GPU core may spawn multiple threads when executing instructions, CPU threads tend to be only virtual as opposed to truly concurrent. In particular, in a CPU core, multithreading is typically accomplished by rapidly switching back and forth between different threads, giving only the appearance of concurrency. By contrast, in a GPU architecture, multiple threads (e.g., thousands) may be capable of executing at the same time.

These characteristics of GPUs—i.e., the ability to employ a greater number of cores per chip and to perform parallel threading—have thus made the use of GPUs increasingly attractive for supercomputing applications due to their greater potential for significant parallelization. However, in practice, the high level of parallelization that is theoretically possible in a multicore, multi-threaded GPU is often not achievable for a number of reasons.

For example, one obstacle to parallel processing is that in order for multiple cores and/or threads to simultaneously execute instructions for any significant period of time, they must each be supplied with a continuous stream of data on which to operate. As a result, programmers who wish to take advantage of the potential parallelization offered by GPUs must program their algorithms in a such manner as to continuously supply each GPU core and/or thread with new data, which in turn requires knowledge of the particular characteristics of the GPUs on which the algorithms will operate. Such characteristics include each GPU's memory capacity and bandwidth, number of cores and threads per core, number of flops per second, etc.

Not only is it impractical for programmers to determine these low-level hardware characteristics and to structure their algorithms around such device-specific considerations, but their algorithms may further become inoperable or obsolete should underlying device implementations change. For example, a single-GPU computing system may be upgraded with a GPU that has an increased core- or thread-count, or GPUs may be added or subtracted from multi-GPU computing system over time. As a result, even the smallest changes to GPU configuration may require significant revisions to algorithms designed to take advantage of concurrency.

Moreover, even if an algorithm is structured so as to evenly divide data and operations between multiple GPU cores and/or threads, sustained parallelization may still not be achieved due to calculation path-dependency issues. Path-dependency may refer to the necessity of performing operations in a particular sequence or to an inability to perform a second operation until operands are obtained from execution of a first operation. For example, in a simple programming loop structure, such as a for-loop, operations presented in the body of the loop may be dependent on certain conditions being satisfied by the loop variables. Path dependency may present a barrier to parallelizing the execution of certain calculations using GPUs, since threads that may be capable of executing certain operations may be forced to wait until other operations have first been performed or necessary input data has been generated.

Accordingly, computing systems that are used to perform calculations over large amounts of data may be improved by techniques for utilizing multiple GPU devices in a way that improves the concurrency with which those GPU devices are able to execute without requiring programmers to customize their algorithms based on the specific characteristics of the GPUs used.

SUMMARY

According to various embodiments, a method of rendering database data in visualized form using a distributed computer system including a plurality of networked worker nodes each including a graphics processing unit (GPU), a sink node, and a head node, is disclosed. The method includes receiving, at the head node, a user initiated request to render data in visualized form, the request including an identification of at least one database table including a plurality of records including data to be rendered and a rendering type; validating the request; forwarding, by the head node, the request to each of the plurality of worker nodes, where each of the plurality of worker nodes includes at least one respective shard of the data to be rendered; processing, in parallel, by at least one GPU of each of the plurality of worker nodes, and based on the request, chunks of respective shards of data to be rendered, where the processing includes: allocating memory in each of the plurality of worker nodes; and rendering the data to be rendered in allocated memory of each of the plurality of worker nodes to form initial images; merging, in parallel, by each of the plurality of worker nodes and for each of a plurality of shards, initial images formed by the processing within respective shards, to form a plurality of integrated images; merging, in parallel, by each of the plurality of worker nodes, respective integrated images to form a plurality of worker node images; transmitting, by each of the plurality of worker nodes, respective worker node images to the sink node; merging, by the sink node, the worker node images to form a final image; converting the final image to an output image; and providing the output image to the user.

Various optional features of the above embodiments include the following. The rendering type may include a classbreak rendering type; where the processing further includes matching at least a portion of the data to be rendered to classbreak information; and where the rendering includes rendering based on the matching. The rendering type may include a heat map rendering type; where the processing further includes: projecting the data to be rendered into a geographic projection space; applying a bounding box specified by the request to the data to be rendered; and maintaining a count of records per image location; and where the rendering includes rendering based on the count of records per image location. The rendering type may include a contour rendering type; and the processing may further include: projecting the data to be rendered into a geographic projection space; and applying a bounding box specified by the request to the data to be rendered; where the method further includes rendering contours on the final image. The rendering type may include a scatter plot rendering type; and the method may further include: aggregating the plurality of records into a plurality of groups according to values of a selected coordinate; and sorting records within each of the plurality of groups. The rendering type may include an internet protocol (IP) rendering type; and the method may further include storing representations of communications between the same IP addresses in the same shard; where the processing further includes applying a bounding box specified by the request to the data to be rendered. The rendering type may include a track rendering type; and the method may further include storing representations of portions of the same track datum in the same shard; where the processing further includes applying a bounding box specified by the request to the data to be rendered. The rendering type may include a feature rendering type, where the feature rendering type includes at least one of point feature rendering type, line feature rendering type, polygon feature rendering type, label feature rendering type, or arrow rendering type; where the processing further includes: projecting the data to be rendered into a geographic projection space; and applying a bounding box specified by the request to the data to be rendered; and where the rendering includes rendering a selected feature type. The feature rendering type may include a label rendering type; and the rendering may include rendering both geometric objects and text. The method may include pre-generating level-of-detail representations of geo-spatial shape data for the data to be rendered; and storing the level-of-detail representations in an electronically-stored quad tree.

According to various embodiments, a distributed computer system for rendering database data in visualized form is disclosed. The system includes a head node including an electronic server computer, the head node communicatively coupled to a computer network and configured to receive and validate a user initiated request to render data in visualized form, the request including an identification of at least one database table including a plurality of records including data to be rendered and a rendering type; a plurality of networked worker nodes each including a graphics processing unit (GPU), communicatively coupled to the computer network, and configured to receive the request from the head node, where each of the plurality of worker nodes includes at least one respective shard of the data to be rendered, and where each of the worker nodes is further configured to process, in parallel, by at least one GPU of each of the plurality of worker nodes, and based on the request, chunks of respective shards of data to be rendered, where the processing includes allocating memory in each of the plurality of worker nodes and rendering the data to be rendered in allocated memory of each of the plurality of worker nodes to form initial images, where the plurality of networked worker nodes are further configured to merge, in parallel, for each of a plurality of shards, initial images formed by the processing within respective shards, to form a plurality of integrated images, and to merge, in parallel, respective integrated images to form a plurality of worker node images; and a sink node communicatively coupled to the plurality of networked worker nodes and configured to receive worker node images from the plurality of networked worker nodes, merge the worker node images to form a final image, convert the final image to an output image, and provide the output image to the user.

Various optional features of the above embodiments include the following. The rendering type may include a classbreak rendering type; where each of the worker nodes is further configured to match at least a portion of the data to be rendered to classbreak information; where the rendering includes rendering based on a result of matching. The rendering type may include a heat map rendering type; where the processing further includes: projecting the data to be rendered into a geographic projection space; applying a bounding box specified by the request to the data to be rendered; and maintaining a count of records per image location; and where the rendering includes rendering based on the count of records per image location. The rendering type may include a contour rendering type; where the processing further includes projecting the data to be rendered into a geographic projection space, and applying a bounding box specified by the request to the data to be rendered; and where the sink node is further configured to render contours on the final image. The rendering type may include a scatter plot rendering type; and the head node may be further configured to aggregate the plurality of records into a plurality of groups according to values of a selected coordinate and sort records within each of the plurality of groups. The rendering type may include an internet protocol (IP) rendering type; where the plurality of networked worker nodes are further configured to store representations of communications between the same IP addresses in the same shard; and where the processing further includes applying a bounding box specified by the request to the data to be rendered. The rendering type may include a track rendering type; where the plurality of networked worker nodes are further configured to store representations of portions of the same track datum in the same shard; where the processing further includes applying a bounding box specified by the request to the data to be rendered. The rendering type may include a feature rendering type, where the feature rendering type includes at least one of point feature rendering type, line feature rendering type, polygon feature rendering type, label feature rendering type, or arrow rendering type; where the processing further includes projecting the data to be rendered into a geographic projection space and applying a bounding box specified by the request to the data to be rendered; and where the rendering includes rendering a selected feature type. The feature rendering type may include a label rendering type; and the may include rendering both geometric objects and text. The system may be further configured to pre-generate level-of-detail representations of geo-spatial shape data for the data to be rendered and store the level-of-detail representations in an electronically-stored quad tree.

The present disclosure addresses these and other improvements to computing systems. In some embodiments, a computing system may include a plurality of GPUs, one or more CPUs, and a data store containing data to be analyzed. The system is configured to allow a user to register a calculation to be performed on the data. During the registration process, the system may determine the characteristics of the plurality of GPUs in the system, including characteristics such as memory capacity, number of cores, and number of threads per core. Based on the characteristics of the plurality of GPUs, the system may determine an efficient scheme for allocating portions of the calculation to different GPUs for concurrent execution.

The system may also determine an efficient plan for "chunking" the data—i.e., dividing up the data on which the calculation is to be performed so as to increase the degree to which each GPU core and/or thread is provided with a steady stream of data for performing its constituent operations. In some cases, in order to ensure that each GPU core and/or thread can continue to work concurrently, multiple copies of some data may be made so that different GPU cores that need access to the data to work on their respective shares of the problem can execute concurrently and without waiting for other GPUs cores to release locks on memory regions.

The system may also perform a number of translations or conversions on the algorithm provided by the user when registering a calculation in order to optimize concurrency. In some embodiments, the system may convert portions of the algorithm that are path-dependent into atomic path-independent operations that may be performed by GPU threads asynchronously. ("Path-dependency" may refer to the necessity of performing operations in a particular sequence or to an inability to perform a second operation until operands are obtained from execution of a first operation.) The system may also determine coordination operations sufficient for merging sub-results generated from the individual threads' execution of the atomic operations back into a path-dependent computation. The system may also provide one or more libraries that enable programmers themselves to improve the path-independency of their algorithms.

The system may be configured to use any number of similar or different GPU devices, and for GPU devices to be added to or removed from the system over time. By keeping track of the specific characteristics of each GPU device in the system, the system can automatically divide up operations and data inputs to those operations efficiently among the plurality of GPUs according to the specific characteristics of each GPU device, such as memory capacity and bandwidth. Thus, programmers can be freed up to focus their efforts on writing effective data calculation algorithms without having to worry about underlying device characteristics. Programmers can also know that their algorithms will continue to be executed with improved concurrency even if the device configuration of the system is changed.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed. It is also to be understood that use of the word "exemplary" throughout the application is to be understood as providing examples that may be useful for illustrating general principles or concepts; thus, figures and descriptions identified as "exemplary" should not be interpreted as representing the best or only approaches to practicing the disclosed embodiments.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
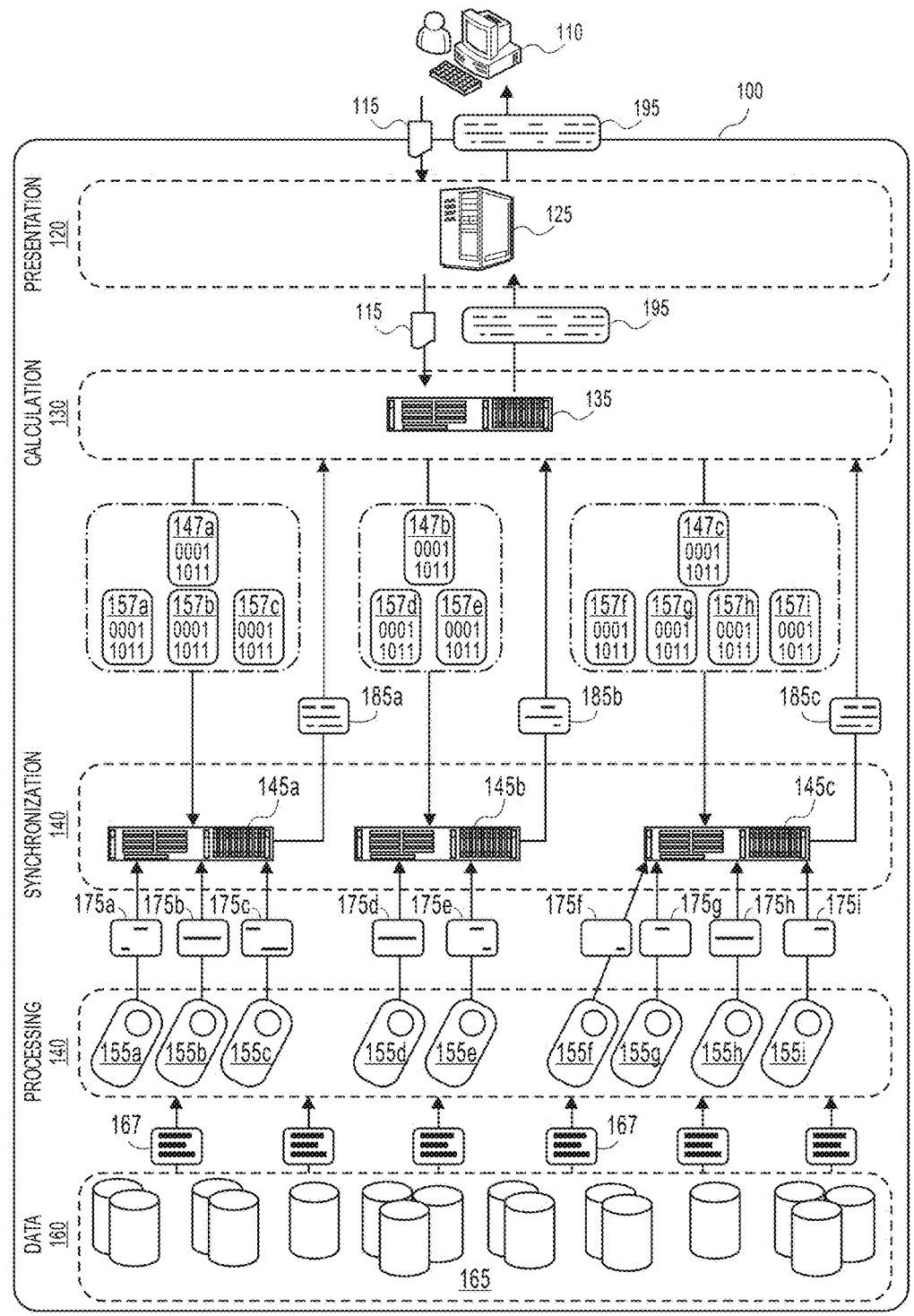
FIG. 1 is a diagram depicting an exemplary hardware and software configuration for a GPU-powered computing system, consistent with certain disclosed embodiments.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

I. EXEMPLARY GPU HARDWARE

FIG. 1 is a diagram depicting an exemplary hardware and software configuration for a GPU-powered computing system, consistent with certain disclosed embodiments. As depicted in FIG. 1, a GPU-powered computing system 100 may comprise various devices, such as a general purpose web server 125, a computing device 135 that includes one or more CPUs, a plurality of GPUs 155 clustered within one or more nodes 145, and one or more memory devices that, together, form a data store 165.

In some embodiments, the components of system 100 may further be logically or structurally arranged according to a plurality of layers 120-160 for the purpose of implementing one or more of the techniques described below. Such layers may include a presentation layer 120, a calculation layer 130, a synchronization layer 140, a processing layer 150, and a data layer 160.

Presentation layer 120 may represent an interface layer between one or more client devices 110 and system 100. Client device 110 may be any desktop, laptop, or mobile computing device capable of communicating with system 100. Client device 110 may interface with system 100 by connecting—e.g., by network or serial connection—to one or more computing devices within presentation layer 120. As further described below, by interfacing with presentation layer 120, a user may provide instructions to system 100 for storing particular types of data, for registering calculations to be performed with respect to the stored data, for instructing system 100 to execute the registered calculations, and for receiving results of the executed calculations. In some embodiments, presentation layer 120 may include one or more web servers 125 that receive and service requests from client devices 110 using hypertext transfer protocol (HTTP) communications. However, those skilled in the art will appreciate that client device 110 may communicate with system 100 using other techniques.

Presentation layer 120 may receive one or more requested calculations from client device 110, and may forward details of such requests on to calculation layer 130 for registration or execution. In some embodiments, calculation layer 130 may comprise one or more CPU-powered computing devices 135 capable of receiving text strings representing algorithms associated with requested calculations and converting such algorithms into instructions capable of execution by a plurality of GPUs in system 100. As further described below, calculation layer 130 may communicate such instructions to synchronization layer 140 in the form of one or more executable kernels 157.

Synchronization layer 140 may comprise one or more nodes 145, which may represent one or more computing devices housing at least one CPU. Each node may further house one or more GPUs 155 capable of executing associated kernels 157. For example, as depicted in FIG. 1, nodes 145a, 145b, and 145c are depicted as housing three, two, and four GPUs, respectively. GPUs 155 may be homogenous or heterogeneous in nature. For example, different GPUs may be manufactured by different entities and/or may have different architectural characteristics, such as different memory capacities or bandwidths, different cache configurations, different core-counts, different thread-counts, etc.

For purposes of illustration, GPUs 155, together, may represent a processing layer 150. GPUs may operate on data copied from one or more memory devices 165 that, together, comprise a data layer 160. As contemplated by the present disclosure, GPUs may be added to or removed from nodes, or additional nodes may be added to system 100. Those skilled in the art will appreciate that the hardware and software layer configuration depicted in FIG. 1 is for illustration purposes only, and that other configurations may be used. For example, in practice, individual nodes 145 may house tens or even hundreds of individual GPUs.

Figure 2:
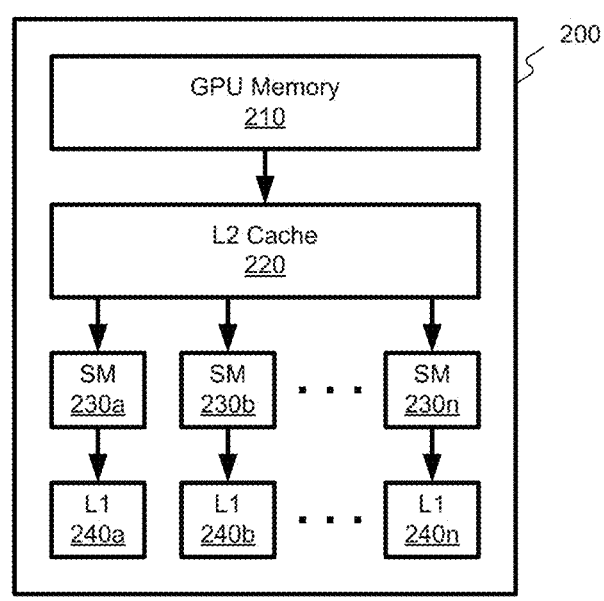
FIG. 2 is a diagram depicting an exemplary architecture of a graphical processing unit, consistent with certain disclosed embodiments.

FIG. 2 is a diagram depicting an exemplary architecture of a graphical processing unit, consistent with certain disclosed embodiments. As depicted in FIG. 2, an exemplary GPU 200 may include GPU memory 210, also known as video random access memory (VRAM), which may represent the largest memory store on GPU 200, but may also be the slowest in terms of writing and reading data. GPU 200 may also include a level 2 cache 220 memory component, which may represent a memory component on GPU 200 that is capable of storing less data than GPU memory 210, but is capable of faster reading and writing operations.

GPU 200 may include a plurality of streaming multiprocessors 230a-230n, also known as cores. Each core 230 may be capable simultaneously executing one or more threads. GPU 220 may additionally include a separate level 1 cache 240 memory component for each streaming multiprocessor 230. Each level 1 cache 240 may be able to store less data than level 2 cache 220, but may be capable of faster reading and writing operations. Each streaming multiprocessor 230 may access data stored in level 2 cache 220 or an associated level 1 cache 240. In some architectures, level 2 cache 220 may be coherent, such that a data-write operation to level 2 cache 220 by one streaming multiprocessor 230 may immediately be seen by other streaming multiprocessors 230, whereas each level 1 cache 240 may not be coherent across multiple threads.

In contrast to CPU devices, the threads of each streaming multiprocessor 230 may be capable of concurrent execution, in contrast to virtual threads. In some GPU architectures, thread concurrency may be achieved by providing a GPU core with an instruction, in response to which each thread in the GPU core simultaneously executes the same instruction on a different set of data, an architecture sometime referred to as "single instruction multiple data" (SIMD).

Thus, as described above, one advantage of using GPUs to perform calculations in system 100 is that, unlike CPU threads, the multiple threads of a GPU may each simultaneously perform operations. Such concurrency may be used to realize significant performance gains when a calculation involves repeating the same or similar operations over large amounts of data. However, as described above, in order to achieve such concurrency, it may be necessary to ensure that multiple threads are continually supplied with new data on which to perform operations, and to ensure that the operations assigned to individual threads are atomic and path-independent in nature, such that threads are not kept in waiting states before they may perform their assigned operations.

II. GPU CALCULATION TECHNIQUES

FIGS. 3 through 7 describe how system 100 may be configured to achieve these goals by tracing the progression of an exemplary calculation through the various layers 120-160 of system 100. For purposes of illustration only, discussion will focus on the processing of Geographic Information System ("GIS") image data to determine topographical characteristics of a geographic regions, such as identifying contiguous bodies of water contained entirely within regional or jurisdictional boundaries.

Figure 3:
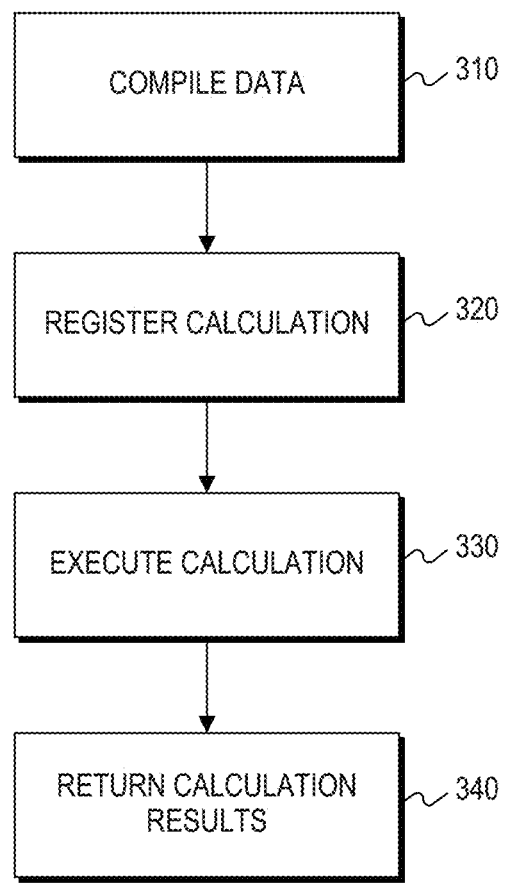
FIG. 3 is a flow diagram depicting an exemplary method of using a GPU-powered computing device to perform a calculation, consistent with certain disclosed embodiments.

FIG. 3 is a flow diagram depicting an exemplary method of using a GPU-powered computing device to perform a calculation, consistent with certain disclosed embodiments. FIG. 3 represents a high-level overview of an exemplary process. Subsequent figures will provide further details for various stages. As depicted in FIG. 3, prior to the performing of any calculations, data on which the calculations are to be performed may first be compiled and stored (step 310).

Figure 4:
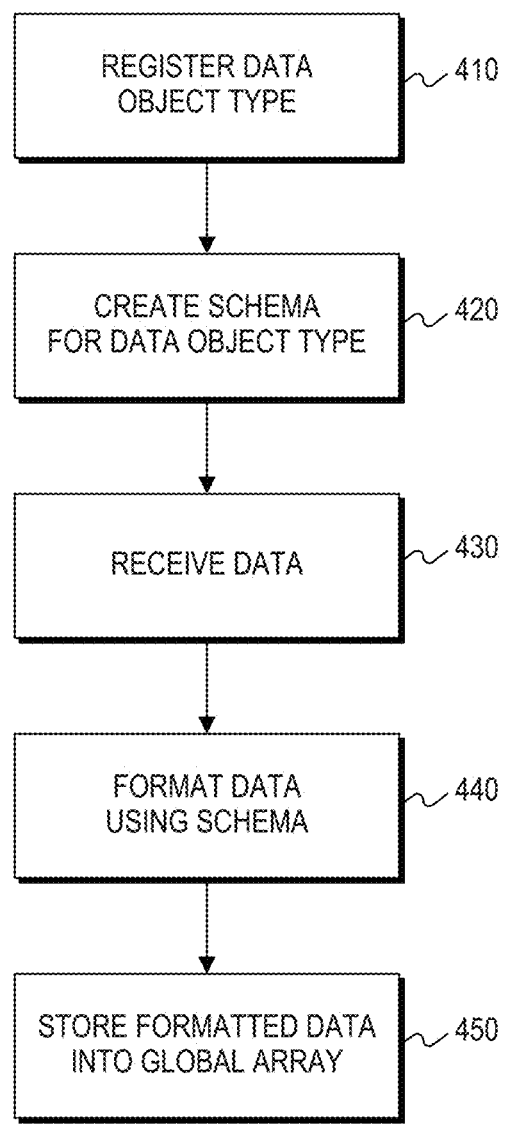
FIG. 4 is a flow diagram depicting an exemplary method of registering and storing data on which one or more calculations may be performed, consistent with certain disclosed embodiments.

FIG. 4 is a flow diagram depicting an exemplary method of registering and storing data on which one or more calculations may be performed, consistent with certain disclosed embodiments. As depicted in FIG. 4, the compilation process may begin by a user registering one or more data objects types with system 100 (step 410). For example, using client device 110, a user may log into system 100 and establish a web or other communication session with server 125. As part of the communication session, the user may specify a type of data that is to be stored in data layer 160.

For example, a user may indicate an intent to store GIS data in data layer 160 representing satellite images of the earth's topography. Such GIS data may be represented by a plurality of digital images, each of which may include one or more matrices of constituent pixels. Pixels themselves may include color data and GIS coordinate data. In this example, both images and pixels may be considered data objects from the standpoint of system 100. Thus, in step 420, presentation layer 120 may prompt the user for, or may automatically determine based on sample data, a schema for one or more data object types that are being registered.

In some embodiments, a schema for a data object type may indicate syntax or rules for representing the data object in binary memory. For example, for purposes of illustration, a schema for a GIS pixel object could specify that the pixel object should be stored as a 72-bit string representing the following ordered information:

| Object Parameter | Bit Sequence |
| --- | --- |
| Latitude: degrees | 0-7 |
| Latitude: minutes | 8-15 |
| Latitude: seconds | 16-23 |
| Longitude: degrees | 24-31 |
| Longitude: minutes | 32-39 |
| Longitude: seconds | 40-47 |
| Color: R | 48-55 |
| Color: G | 56-63 |
| Color: B | 64-71 |

Those skilled in the art will appreciate that the foregoing data object type schema is exemplary only, and that other, more complex data object type schemas may be created.

Once system 100 has created the schema for the data object type, it may begin to receive data (step 430). Data may be received in a streaming or batch-like fashion from one or more external devices. As the data is received, system 100 may format the received data using the appropriate schema (step 440) and store the formatted data into data layer 160 as a global array (step 450). For example, system 100 may store the data within one or more hard drives 165 that make up data layer 160.

Figure 5:
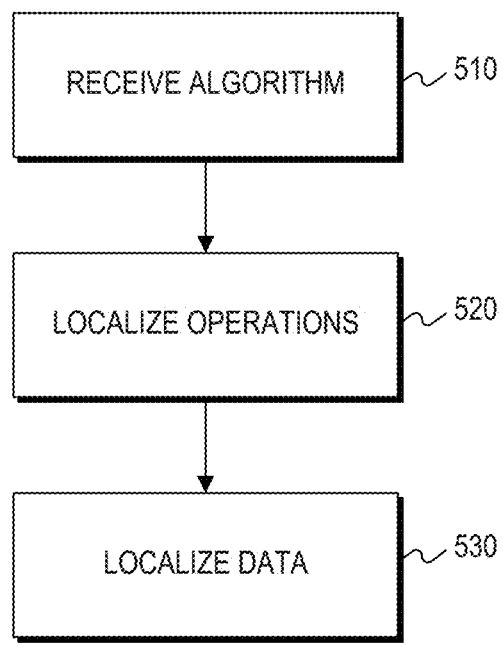
FIG. 5 is a flow diagram depicting an exemplary method of registering a calculation to be performed, consistent with certain disclosed embodiments.
Figure 6:
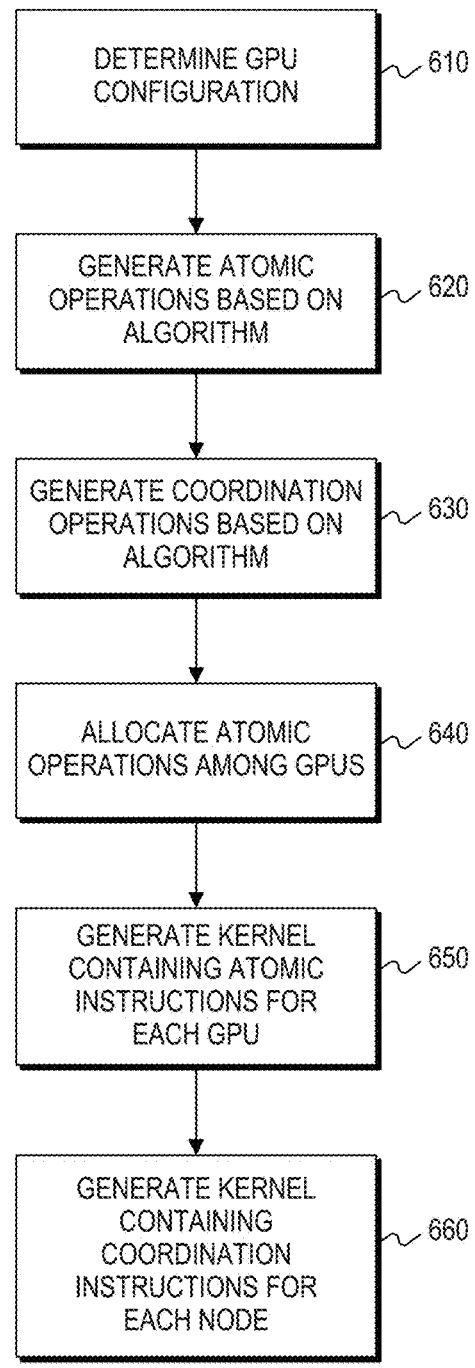
FIG. 6 is a flow diagram depicting an exemplary method of localizing computations during the calculation registration process, consistent with certain disclosed embodiments.

FIG. 5 is a flow diagram depicting an exemplary method of registering a calculation, consistent with certain disclosed embodiments. Once the data necessary to perform calculations has been ingested into system 100, the system is now ready for a user to register a calculation. Thus, in step 510, system 100 may receive an algorithm from a user. For example, as depicted in FIG. 1, the user may use client device 110 to transmit an algorithm 115 to presentation layer 120. Algorithm 115 may comprise one or more textual strings representing operations that may be used to perform the requested calculation on the stored data.

In some embodiments, the algorithm may comprise a series of instructions, specified using one or more standard programming languages such as C or Java™, for accomplishing the requested calculation. Thus, using the example of determining contiguous bodies of water contained entirely with regional or jurisdictional boundaries, the algorithm may include instructions for determining, for each regional and jurisdictional area, the complete set of GIS pixel objects that represent image data in that area; for each GIS pixel object, determining whether its color data is consistent with an expected color range of water imagery; and for each GIS pixel object identified as potentially representing water, the set of all contiguous pixels similarly consistent with water imagery. Those skilled in the art will appreciate that the foregoing algorithm instructions are exemplary only.

Next, in step 520, system 100 may localize the operations of the algorithm. In some embodiments, as depicted in FIG. 1, localizing the operations of the algorithm may comprise presentation layer 120 passing algorithm 115 down to calculation layer 130, where one or more computing devices 135 may determine how the operations of the algorithm may be segregated or modified to increase the degree to which the operations may be executed in parallel, based on the specific device configurations of synchronization layer 140 and processing layer 150. Exemplary steps for perform such localizations to improve concurrency are further depicted in FIG. 6.

In step 610, calculation layer 130 may determine the device configurations of synchronization layer 140 and processing layer 150. For example, calculation layer 130 may determine how many nodes 145 are present in synchronization layer 140 and how many GPUs 155 are resident in each node 145. Calculation layer may also determine device characteristics of each GPU 155, such as each GPU's VRAM capacity and bandwidth, memory cache configuration, number of cores, and number of threads capable of being spawned per core.

In some embodiments, calculation layer 130 may next convert some or all of the user's algorithm into two sets of operations: atomic operations and coordination operations. Atomic operations may represent operations that may be performed by one or more threads of GPUs 155 in a path-independent manner—i.e., without waiting for certain conditions to occur or without for data inputs from other operations to be determined. By contrast coordination operations may represent operations that either break path-dependent instruction sequences into constituent atomic operations or merge the results of atomic operations back into a path-dependent result or series of instructions that, when executed, derive a path-dependent result from the results of the atomic operations. Thus, in steps 620 and 630, respectively, calculation layer may 130 may generate atomic operations and coordination operations based on the user-provided algorithm.

In some embodiments, coordination operations may include operations for copying data that may be needed by two or more different atomic operations. For example, as described above, a calculation for identifying contiguous bodies of water within a regional or jurisdictional area may involve at least three separate operations that may be performed on the same GIS pixel object: (1) determining its regional or jurisdictional area, (2) analyzing is color data, and (3) comparing it to adjacent pixels. In this example, each operation may be performed on the data representing the pixel object independently of the other operations. Hence, data segments representing various GIS pixel objects may be copied such that each GPU that is to perform operations on the pixel objects stored therein may have an independent copy of the data.

In some cases, parts of a user-supplied algorithm may be difficult to segregate into path-dependent and path-independent operation sets. For example, the majority of operations specified by the algorithm may depend on certain conditions being satisfied or on receiving input data. Thus, in some embodiments, generating atomic operations may comprise generating operations that are capable of atomic execution even if their results might ultimately be discarded.

For example, it may be determined that a path-dependent operation specified in an algorithm cannot be executed until it receives a particular input, the value of which is unknown until run-time. However, if it can be determined that the input value will likely fall within a certain range of integers, then a set of atomic operations can be generated to be performed by a separate thread or GPU core, each operation including using a different value within the range as an input. Although, at run-time, the result of only one such operation may be used (e.g., merged back into a path-dependent result), the thread tasked with executing that operation will be able to execute it during run-time in an atomic and asynchronous manner—i.e., without having to wait for any condition or input value. Moreover, because of the significant number of operations that may be performed by separate threads in a highly concurrent processing environment, the "wasted" operations of the threads whose results were not used may be significantly outweighed by the efficiencies that allowed the single thread whose result was used to execute without delay.

Once atomic and coordination operations have been determined based on the user-supplied algorithm, in step 640, calculation layer 130 may allocate various atomic operations among or between GPUs. Calculation layer 130 may allocate atomic operations in a manner designed to increase concurrency. For example, in the above example, calculation layer 130 could allocate to node 145a (and, hence, GPUs 155a-155c) atomic operations for determining regional or jurisdictional areas associated with each pixel object, to node 145b (and, hence, GPUs 155d-155e) atomic operations for analyzing each pixel object's color data, and to node 145c (and, hence, GPUs 155f-155i) atomic operations for identifying adjacent pixels. Calculation layer 130 may determine which nodes or GPUs should receive which atomic operations based on the characteristics of each GPU, including memory capacity and bandwidth, GPU core- and thread-count, and GPU processing speed.

In some embodiments, after calculation layer 130 has determined an allocation of atomic operations among nodes or GPUs, calculation layer 130 may generate programming language code for each GPU capable of instructing each GPU to perform its allocated operations in a manner consistent with its architecture. Such code may be in the form of a framework for writing programs that execute across heterogeneous CPUs, and GPUs, and other processors or other appropriate GPU programming frameworks.

For each GPU 155 for which calculation layer 130 has generated such code, it may compile a kernel from the code (step 650), which may represent an executable or bytecode representation of the code. As depicted in FIG. 1, calculation layer 130 may generate a separate kernel 157 for each GPU 165 that instructs each GPU 155 how to perform its specifically allocated operations in a manner consistent with its architecture. For example, kernel 157a may pertain to GPU 155a, kernel 175e may pertain to GPU 155e, kernel 157g may pertain to GPU 155g, etc.

In some embodiments, calculation layer 130 may also allocate some or all coordination operations to one or more nodes 145. For example, node 145a may be tasked with coordinating the sub-results of its GPUs' execution of path-independent operations into one or more path-dependent results. Such instructions may be provided to one or more nodes 145 for execution by the nodes' CPUs, and may be compiled into one or more CPU-executable or bytecode kernels.

Thus, as depicted in FIG. 1, after calculation layer 130 has determine atomic operations and coordination operations, has allocated such operations to individual GPUs and node CPUs, and has generated executable kernels based on the allocated operations, calculation layer 130 may pass the kernels down to synchronization layer 140. For example, calculation layer 130 may pass a CPU-executable kernel 147a (representing coordination operations to be executed by one or more CPUs) and GPU-executable kernels 157a-157c (representing atomic operations to be executed by respective GPUs 155a-155c) to node 145a. Calculation layer 130 may pass similar packages to nodes 145b and 145c, as depicted in FIG. 1.

Returning to FIG. 5, after computations have been localized, system 100 may then localize data (step 530). In some embodiments, localizing data may involve determining a scheme for copying data from data layer 160 to processing layer 150 in a manner that takes advantage of the particular characteristics of each GPU 155. In particular, calculation layer 130 may determine operations for copying data so as to increase the amount of data stored in the VRAM of each GPU 155 on which the threads of the GPU are capable of executing their allocated atomic operations—i.e., to supply each GPU core with a steady stream of data on which to operate-a process that may also be referred to as "chunking."

Similar to the allocation of atomic operations, calculation layer 130 may determine efficient chunking operations based on the specific characteristics of GPU 155, such as its memory capacity and bandwidth, its core- and thread-count, its processing speed, etc. Chunking operations may also be determined based on the determined allocation of atomic operations during the operation localization stage 520. Chunking operations may also include operations for copying data from data layer 160 across multiple nodes, GPUs, or GPU cores in order to facilitate parallel and asynchronous execution of atomic operations. In some embodiments, chunking operations may be delegated to nodes 145 for execution by node CPUs and, thus, included within associated CPU kernels 147. In still further embodiments, localizing data in step 530 may include copying an initial set of data to one or more GPUs 155 in order to reduce latency when the user instructs system 100 to execute the registered calculation.

Returning to FIG. 3, once the calculation has been registered, user device 110 may be notified by presentation layer 120 that system 100 has completed the registration process. Next, in step 330, a user may instruct system 100 to execute the registered calculation. Exemplary steps for executing a registered calculation are further depicted in FIG. 7, which steps are further illustrated in FIG. 1.

Figure 7:
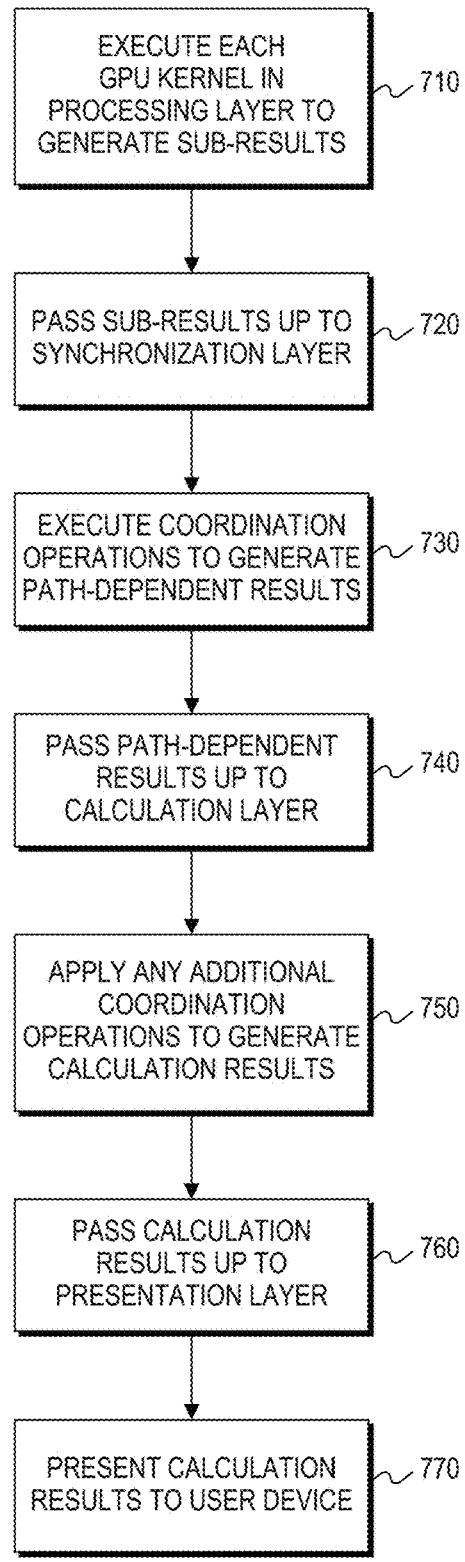
FIG. 7 is a flow diagram depicting an exemplary method of performing a registered calculation, consistent with certain disclosed embodiments.

As depicted in FIG. 7, executing the registered calculation may involve executing each kernel 157a-157i, using the associated GPUs 155a-155i in processing layer 150 (step 710). GPUs 155 may generate sub-results of the atomic operations that have been allocated to them, and may pass such sub-results up to synchronization layer 140 (step 720). For example, as depicted in FIG. 1, each of GPUs 155a-155i generates a set of respective sub-results 175a-175i that are then passed up to synchronization layer 140.

Synchronization layer 140 may then execute coordination operations to generate path-dependent results (730). For example, as depicted in FIG. 1, one or more CPUs in each of nodes 145a-145c may execute an associated CPU kernels 147a-147c in order to merge path-independent sub-results 175 into path-dependent results 185a-185c. Synchronization layer 140 may then pass such path-dependent results 185 up to calculation layer 130 (step 740).

In some embodiments, calculation layer 130 may itself perform various coordination operations to merge the path-dependent results 185 from synchronization layer 140 into a set of final calculation results 195, which may then be passed up to presentation layer 120 for formatting and other presentation operations. Presentation layer 120 may then format the calculation results 195, if necessary, and present them to the user device 110 (step 770).

Those skilled in the art will appreciate that the steps depicted in FIG. 7 may not be performed in a fully ordered or separated manner. For example, because the data on which the registered calculation is performed may be voluminous, GPUs 155 may continually execute atomic operations over new data, passing associated sub-results up to synchronization layer 140 as they are generated. Synchronization layer 130 may also continually merge sub-results into path-dependent results as sub-results are received, and may in turn continually retrieve and chunk data from data layer 160 in order to supply GPUs 155 with a continuous stream of data on which to operate. In some cases, each of steps 710 through 750 may be performed continuously as new data is retrieved from data layer 160, processed by processing layer 150, merged by synchronization layer 140 and/or calculation layer 130. In some cases, steps 760 and 770 may also execute continuously, such as when results are presented to the user as they are calculated.

III. FIRST EXEMPLARY APPLICATION: GEOGRAPHICAL VISUALIZATION

Figure 8:
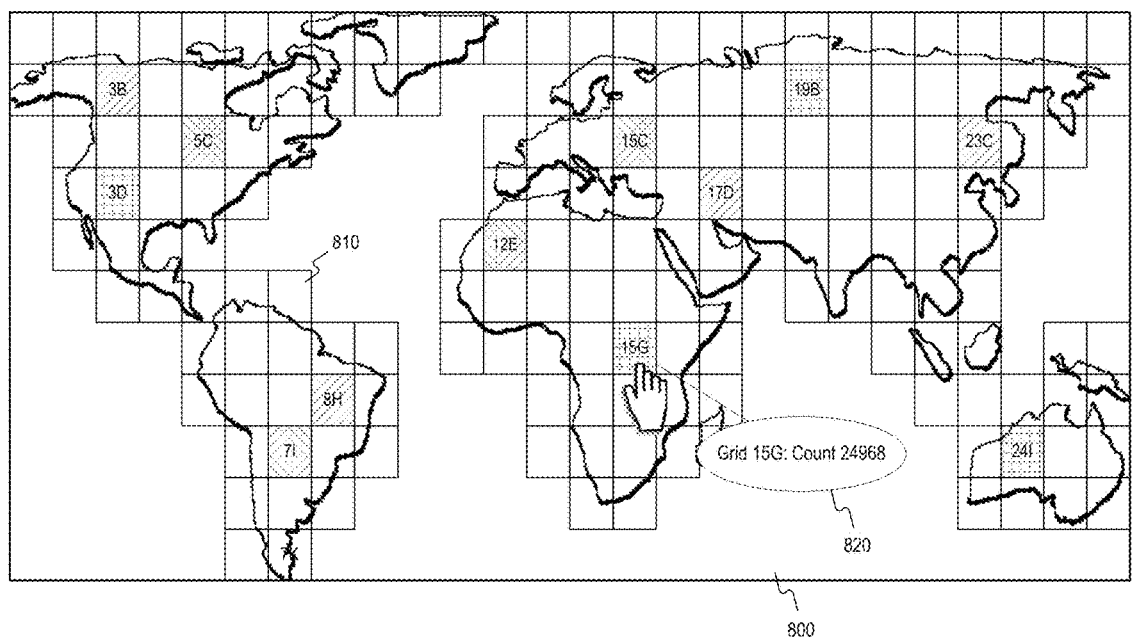
FIG. 8 is a diagram depicting an exemplary application of the present disclosure for visualizing information having geographical attributes using Geographic Information System ("GIS") imagery.

In some embodiments, the foregoing system may be used to implement an application for using GIS imagery for visualizing information that has a geographical component. For example, as depicted in FIG. 8, an image 800 of a geographical area may be presented on a display device for viewing. Here, image 800 may represent an image or composite image of the earth's surface as captured by one or more satellites.

Additionally, a grid may be overlaid on top of image 800 that includes a plurality of cells 810. Each cell may represent a distinct geographical area and may have dimensions of a certain number of degrees of latitude and a certain number of degrees of longitude. Each cell 810 may be associated and/or labeled with a distinct identifier. For simplicity, FIG. 8 depicts labels (e.g., "3B," "15G," "24I," etc.) for only a subset of cells 810.

In some embodiments, the data stored in data store 165 may comprise information tied to particular geographical locations. For example, an event may have occurred at a particular geographic location, or a message or communication may have originated from a particular geographic location. In these and other cases, the event or message may be stored as a data object that includes both its geographical location and its informational content.

The above described architecture and algorithms may be used to visualize such information by dynamically formatting graphical indicators overlaying satellite imagery of the earth's surface (or synthetic imagery based thereon). For example, in one embodiment, at a high geographical zoom level, each grid cell 800 may be color coded according to how many events or messages fall geographically within the area encompassed by the cell. In FIG. 8, for ease of illustration, patterns are used instead of colors to represent the event- or message-count for cells, and only a subset of the cells are so depicted. In practice, however, most or all cells may be color coded.

Additionally, in some embodiments, the display may provide a way for a user to see the event- or message-count associated with a particular cell, such as by displaying a message 820 when a cursor enters the cell area or the cell is selected using other actions. Thus, as depicted in FIG. 8, cell 15G has an event- or message-count of 24,968.

When the number of event or message objects stored in data store 165 is large, it may be a significant computational burden to generate and display the kind of information depicted in FIG. 8. For example, it may require processing hundreds of thousands or millions of event or message data objects to determine, for each data object, which grid cell 810 the event or message falls within based on its geographical data. Then, once all records are processed, it may require counting the number of events or messages falling within each grid cell to determine a total event- or message-count. For record sets containing hundreds of thousands or millions of records, such computations may take hours or days using conventional computational techniques.

Figure 9:
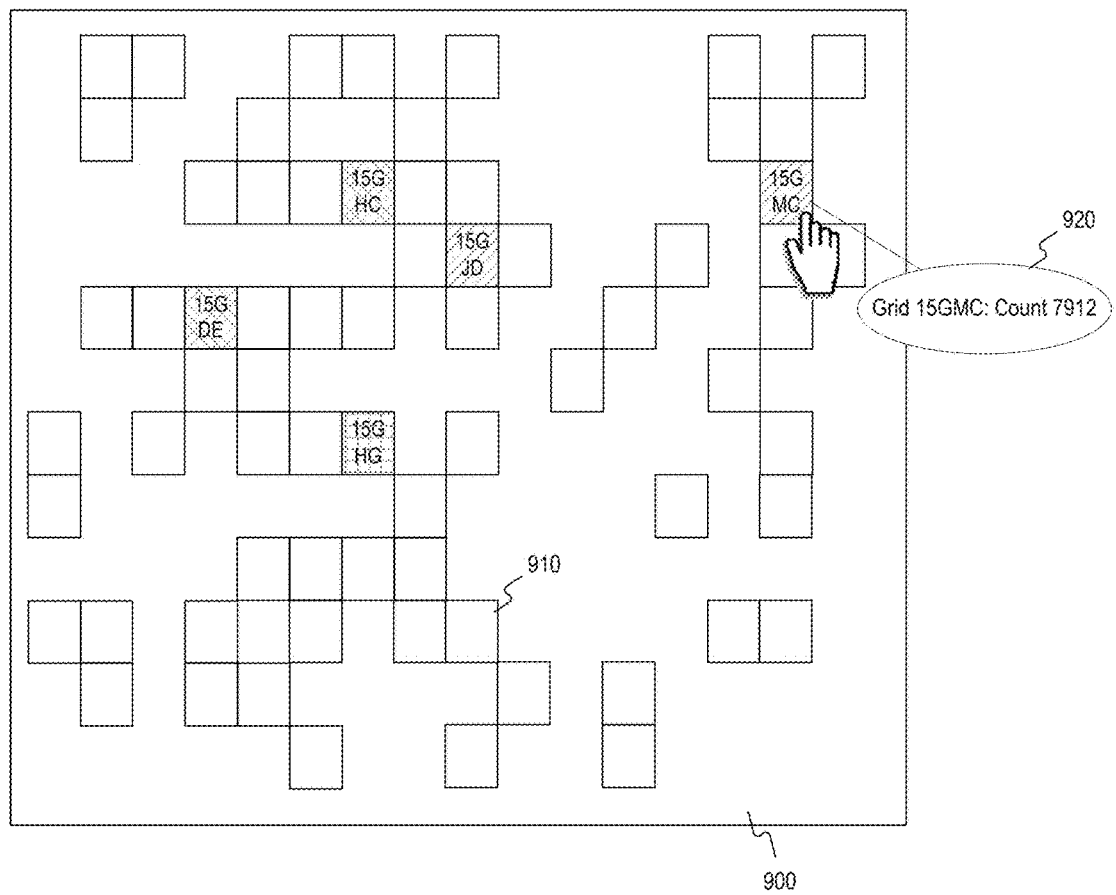
FIG. 9 is a diagram depicting an exemplary application of the present disclosure for visualizing information having geographical attributes using GIS imagery.

In some embodiments, the application depicted in FIG. 8 may further provide functionality for enabling users to adjust the zoom level at which information is displayed. For example, as depicted in FIG. 9, a user may elect to zoom the display to an image 900 that includes the contents of grid cell 15G only. Once the user has zoomed down to the level of grid cell 15G, a new grid may be overlaid on image 900 that includes a plurality of grid cells 910. Each grid cell 910 may cover a smaller subset of image 900, such as a certain number of minutes of latitude and a certain number of minutes of longitude.

Similar to FIG. 8, each grid cell 910 may be associated with a distinct label and may be color-coded according to how many events or messages are associated with the geographical area represented by the grid cell. For ease of illustration, FIG. 9 depicts labels and color codes (in the form of patterns) for only a subset of grid cells 910.

Also, similar to FIG. 8, the display may provide a way for a user to see the event- or message-count associated with a particular cell, such as by displaying a message 920 when a cursor enters the cell area or the cell is selected using other actions. Thus, as depicted in FIG. 9, cell 15GMC has an event- or message-count of 7,912.

Figure 10:
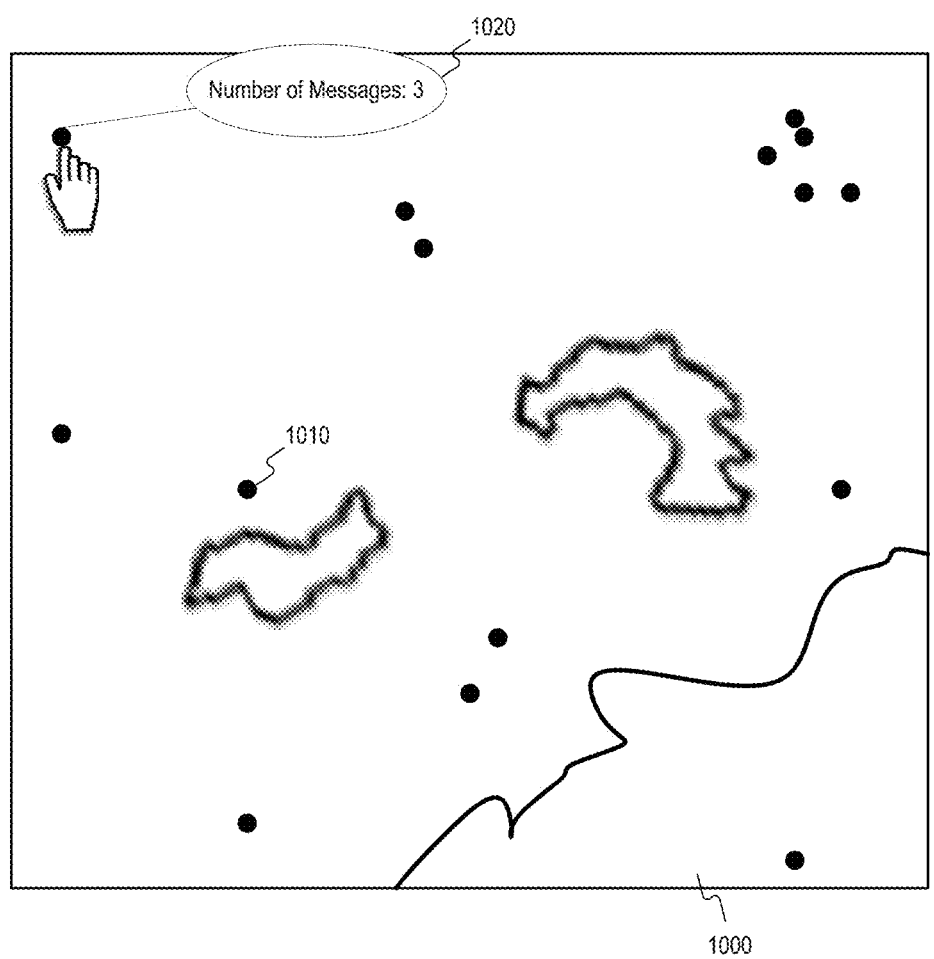
FIG. 10 is a diagram depicting an exemplary application of the present disclosure for visualizing information having geographical attributes using GIS imagery.

A user may continue to zoom to lower levels. FIG. 10 depicts an image 1000 that represents only the contents of cell 15GMC. As can be seen in FIG. 10, once the user has zoomed to a sufficiently low level, rather than displaying grid cells, individual points 1010 may be depicted, each point representing an actual location in which an event occurred or from which a message was received. Thus, when a cursor is placed on or near a point, the system can display a message 1020 indicating the event- or message-count associated with the point.

Although FIGS. 8-10 depict zooming operations in which the user has zoomed from a map of the whole earth to the contents of a particular cell 15G, to the contents of another smaller cell 15GMC, in practice, zooming operations may be more fluid. For example, rather than zooming from image 800 to the contents of a single cell 15G, the user could instead zoom in to an intermediate zoom level, such as that of a particular hemisphere or continent. Upon each zooming operation, the system may alter the grid system to match the new zoom level, and may accordingly update the grid labels and color codes to reflect event- or message-counts for the cells in the new grid system.

If the number of records stored in data store 165 is large, the calculations needed to dynamically create, label, and color-code each new grid system may be prohibitively expensive using conventional computing techniques. However, the above-described techniques for achieving concurrency may greatly speed up the rate at which such calculations may be performed by an order of magnitude or more. In particular, in some embodiments, each zooming operation may result in the analysis of all or a subset of data objects in the data store. Using one or more of the above-described techniques, calculations for individual messages or event objects may be parceled out to individual GPUs and/or threads for concurrent analysis.

IV. SECOND EXEMPLARY APPLICATION: SPECIALIZED VISUALIZATION

Some embodiments provide a distributed visualization framework to leverage the massive parallel computing power of multi-core devices such as GPUs and other accelerators to render data on the fly. Data that can be visualized may be localized and stay within the data warehouse. A series of compute jobs go through data that needs to be visualized and shards data to specific quadrants or grids, and the multicore devices compute and render individual grids until all grids are rendered. The grids are then mosaicked into one or many images that are served via web services over protocols such as Hyper Text Transfer Protocol ("HTTP") or using web services such as Web Mapping Service ("WMS") and Keyhole Markup Language ("KML").

Thus, as presented in this Section in reference to FIGS. 12-25, some embodiments provide the ability to render large amounts of data for visualization. Such embodiments may be implemented using the hardware disclosed herein, e.g., as shown and described in reference to FIGS. 1, 2 and 11, and/or employing the calculation and processing techniques disclosed herein, e.g., as shown and described in reference to FIGS. 3-10.

As shown and described in reference to FIGS. 12-25, data may be rendered as features, with contours, as a heatmap, as a scatterplot as a network map (e.g., using native Internet Protocol ("IP") data types), or as a track rendering, the latter being described in detail below in reference to FIGS. 24 and 25.

Importantly, these various renderings may be combined. For example, data may be rendered as features, and then contours may be added. As another example, data may be rendered as a scatterplot and colored according to classbreak information, described in detail below in reference to FIGS. 22 and 23. As yet another example, time series location data may be visualized as tracks (described in detail below in reference to FIGS. 24 and 25) using arrow features, and shaded according to classbreak information. These and other combinations are contemplated.

Figure 11:
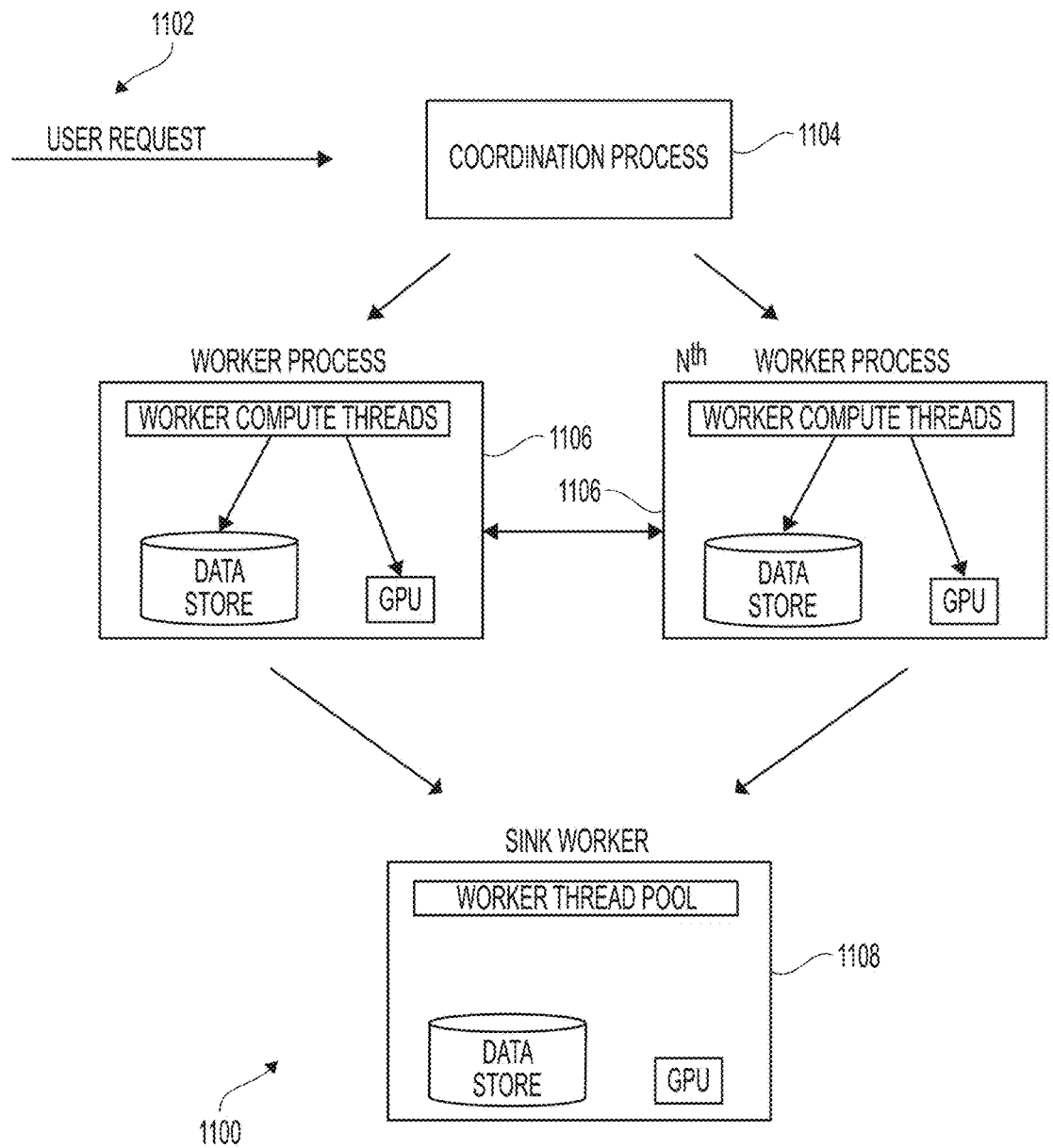
FIG. 11 is a hybrid diagram of a technique for rendering data according to various embodiments.

FIG. 11 is a hybrid diagram 1100 of a technique for rendering data according to various embodiments. The technique may be implemented on hardware as illustrated, and/or on hardware disclosed herein, e.g., as shown and described in reference to FIGS. 1, 2 and 11. The technique may utilize the calculation and processing techniques disclosed herein, e.g., as shown and described in reference to FIGS. 3-10. The technique may be used to implement any of the methods shown and described herein in reference to FIGS. 12-25.

The technique of FIG. 11 may commence when a user initiates a visualization request 1102, e.g., by invoking a certain API call, or via a REST service such as a WMS, that identifies the data to be rendered and how that data should be rendered.

The data to be rendered may be stored in a database as described herein. The database may execute on a cluster of nodes (i.e., servers), each of which implements one or more processes. Each process (except, possibly, for at the head node) houses one or more shards (i.e., parts of a partition) of data. Within each shard, data is further broken down into chunks, typically of size 8,000,000 records (where a record may be implemented as a row in the database). The data to be rendered may be stored in one or more tables of such a database, The tables may contain one or more columns. The columns may be used to store Cartesian (or geographic) coordinate data. Such coordinates may be stored, e.g., with x components in a designated X coordinate column and corresponding y components in a corresponding designated Y coordinate column. Additional dimensions may be accommodated with additional columns, e.g., with altitude (z) components stored in a corresponding designated Y component column, temperature components (t) stored in a corresponding designated T component column, etc. Each table may be distributed across the cluster, with some records housed in each shard, potentially split into multiple chunks.

As depicted in FIG. 11, a coordination process at head node 1104 receives request 1102 and creates a rendering strategy that configures all machines in the cluster to leverage their portion of the data and the compute capabilities that they have to render a small portion of the overall image pixel map.

The job request and strategy is sent to all worker nodes 1104 in the cluster, and they perform the visualization work that they were assigned with information on which node to send their finished result to. Worker nodes 1104 may leverage available computing capability to visualize the data.

Worker nodes 1104 then send their results to sink node 1108 that takes all portions of the pixel map provided to it by the worker nodes and stitches them together to create a complete rendering of the desired visualization of the user. According to some embodiments, sink node 1108 may be the same as head node 1102. The final pixel map is then encoded in an image codec into a suitable format, such as PNG, JPEG, JPEG2000, etc. and returned to the user, e.g., via the API function or REST service that the user had originally made the request with.

Figure 12:
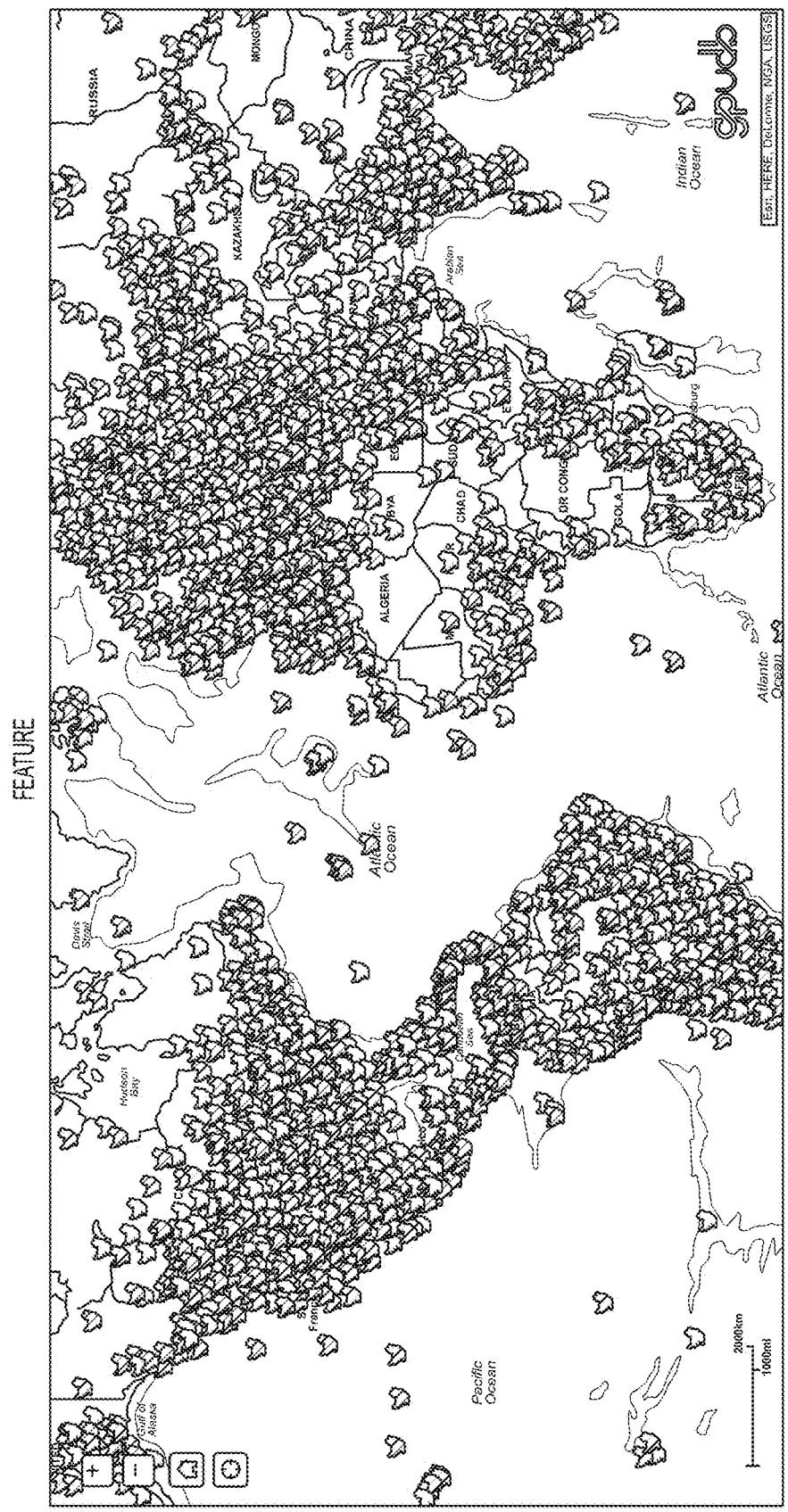
FIG. 12 is an example visualization of rendered features according to various embodiments.

FIG. 12 is an example visualization 1200 of rendered features according to various embodiments. According to various embodiments, many different types of features may be rendered. Thus, a "feature" as used herein may be a point, line, polygon, arrow, icon (e.g., shape, image, or complex symbol), or label (i.e., text, with or without one of the aforementioned features). Features may be rendered at coordinates provided in the data to be rendered. As shown in visualization 1200, icons representing TWITTER tweets are rendered at various geographic locations around the world on a Web Projection map. A process for rendering visualizations such as visualization 1200 is presented below in reference to FIG. 13.

Figure 13:
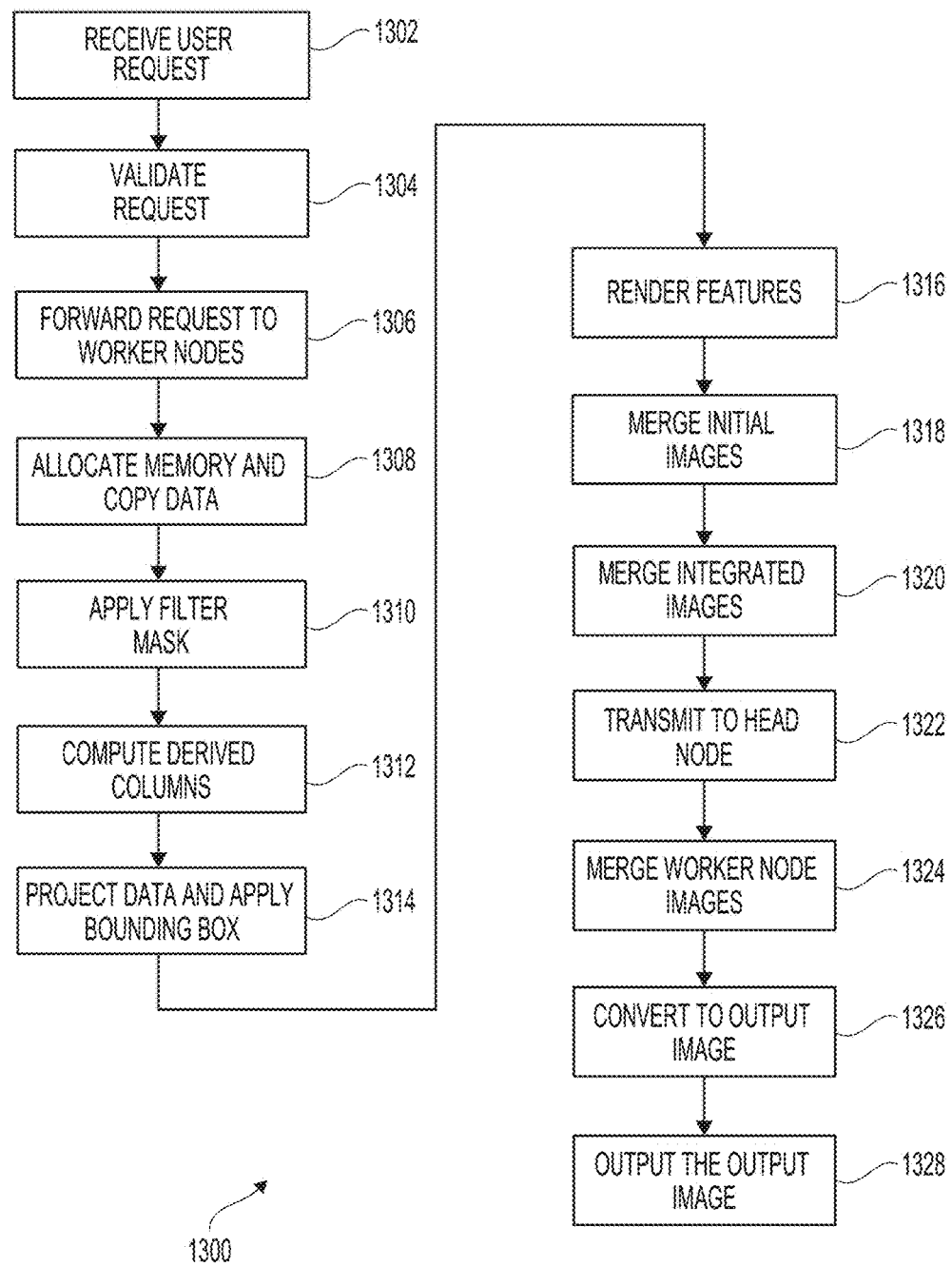
FIG. 13 is a flow diagram for a method of rendering features according to various embodiments.

FIG. 13 is a flow diagram for a method 1300 of rendering features according to various embodiments. Method 1300 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10.

At block 1302, a client makes a request to visualize data. The request may be made via an HTTP endpoint or via WMS, for example. The request may specify the type of rendering (here, feature rendering) and may specify values for any, or a combination, of the following parameters: the table or tables containing the data to be rendered, the specific columns or derived columns containing the data to be rendered (typically specified as X and Y columns), a visualization renderer type, the requested image dimensions (width and height, e.g., specified in pixels), dimensions of the bounding box (i.e., geographic extent) of the data to be rendered, the mapping projection to be used to relate the bounding box to the actual data (this is because the data may be in units of degrees latitude/longitude but the bounding box may be specified in a particular projection, e.g., Web Mercator, or Plate Carrée), and/or various styling options. The styling options may specify parameters such as color, icon, blur radius, font and font size (for labels), etc. The request is sent to the HTTP server at the head node.

At block 1304, the head node validates the request. This may be performed to ensure that all parameters are valid (e.g., that the table exists, the columns exist and are of the appropriate data type, etc.). If the request is valid, then control passes to block 1306; otherwise, the process terminates with an informative error message.

At block 1306, the head node forwards the request to each of the worker nodes. The forwarding may be accomplished across the distributed computing system using TCP/IP, for example.

The actions of blocks 1308, 1310, 1312, 1314, 1316, 1318, and 1320 as described below may be performed in parallel by each a plurality of worker nodes. More particularly, the actions of these blocks may be performed in parallel across processes and associated shards and chunks by each of the plurality of worker nodes, e.g., with each of multiple process threads handling respective chunks in each of the plurality of worker nodes. The following describes the individual worker node actions.

At block 1308, each worker node allocates image buffer memory (e.g., for a size specified in the user's request). Within each processing thread, the data to be rendered is accessed, and the source columns are copied to the allocated memory. Each worker node places the request on a job queue for each shard (possibly for multiple chunks within a shard) present at the respective worker node. At each shard (or chunk), a thread picks up the job from the queue and begins execution.

At block 1310, each worker node applies a filter mask (e.g., a stencil), potentially removing some data points (this may be due to a previous filter, e.g., a view). The actions of this block are optional according to some embodiments.

At block 1312, each worker node computes any derived columns needed or useful for rendering the data. Such derived columns may be populated with any of a variety of data, such as classbreak classification, described in detail below in reference to FIGS. 22 and 23. The actions of this block are optional according to some embodiments.

At block 1314, data from the X and Y columns or geospatial columns are projected into the appropriate geographic projection space as specified by the request. Here, "projection" refers to mapping between coordinate systems (also known as spatial reference systems). Basically, projection provides a way to convert from 3D spherical or ellipsoidal coordinates (e.g., latitude and longitude) to a two-dimensional image. The destination geographic projection space may be, for example, a Web Mercator, or Plate Carrée. The actions of this block are optional according to some embodiments.

Also as part of block 1314 (or as a separate task), the bounding box specified by the request may be applied to the projected data.

At block 1316, each worker node renders its respective chunk(s) of its respective shard(s) of the data to be rendered, consistent with the request received per block 1302. A single worker node may render multiple chunks in parallel, and multiple worker nodes may operate as such in parallel. The resulting rendered images are referred to herein as "initial images". The particular rendering may depend in part on the type of feature (e.g., point, line, polygon, arrow, icon, or label) to be rendered at each specified location.

For rendering the data as points, the filtered x and y locations are passed on to the feature rendering subsystem which will draw points at the x and y locations into the allocated image. The points are rendered with the provided styling options, including selections of values for any, or a combination, of color, shape, size, or symbology.

For rendering the data as lines, the filtered vertices are passed on to the feature rendering subsystem, which draws the individual points are well as the line segments connecting the points into the allocated image. The end points that define the lines are rendered with the provided styling options, including selections of values for any, or a combination, of color, shape, size, or symbology. The lines connecting the defining end points are rendered with the provided styling options, including any, or a combination, of line width, color, or stippling (dashing).

For rendering the data as polygons, the filtered polygon vertices are passed on to the feature rendering subsystem, which draws the individual points at the vertices are well as the line segments connecting the points into the allocated image. The points that define the polygon vertices are rendered with the provided styling options, including selections of values for any, or a combination, of color, shape, size, or symbology. The lines connecting the defining vertices are rendered with the provided styling options, including any, or a combination, of line width, color, or stippling (dashing). The polygons are rendered with the provided styling options, including any, or a combination, of fill color, opacity, or fill pattern.

A description of rendering the data as arrows, in the context of track data objects, is presented below in reference to FIGS. 24 and 25.

At block 1318, the initial images (which contains the result from a single chunk) are then merged with the initial images from the other chunks within the shard to form a single "integrated image", one integrated image per shard. Each worker node may merge chunks from multiple shards in parallel, and this process may be performed in parallel across the worker nodes.

At block 1320, the integrated images, each corresponding to a shard of the data to be rendered, within each worker node are merged to form "worker node images", one per worker node.

At block 1322, the worker nodes transmit their respective worker node images to the head node. The transmission may be by way of TCP/IP.

At block 1324, the head node merges the worker node images into a "final image". The final image may be in bitmap format, for example. Note that because the memory allocated at each worker node corresponds to the size of the final image, and because the integrated images are transparent, the merging may be accomplished by alpha-blending, for example.

At block 1326, the head node converts the final image into an "output image". This conversion process may convert the final image from a bitmap to a different, more convenient format, for example, one with included compression, such as JPEG, GIF, PNG, etc.

At block 1328, the head node outputs the output image to the user who provided the request at block 1302. The output may be by way of API or WMS, for example.

Figure 14:
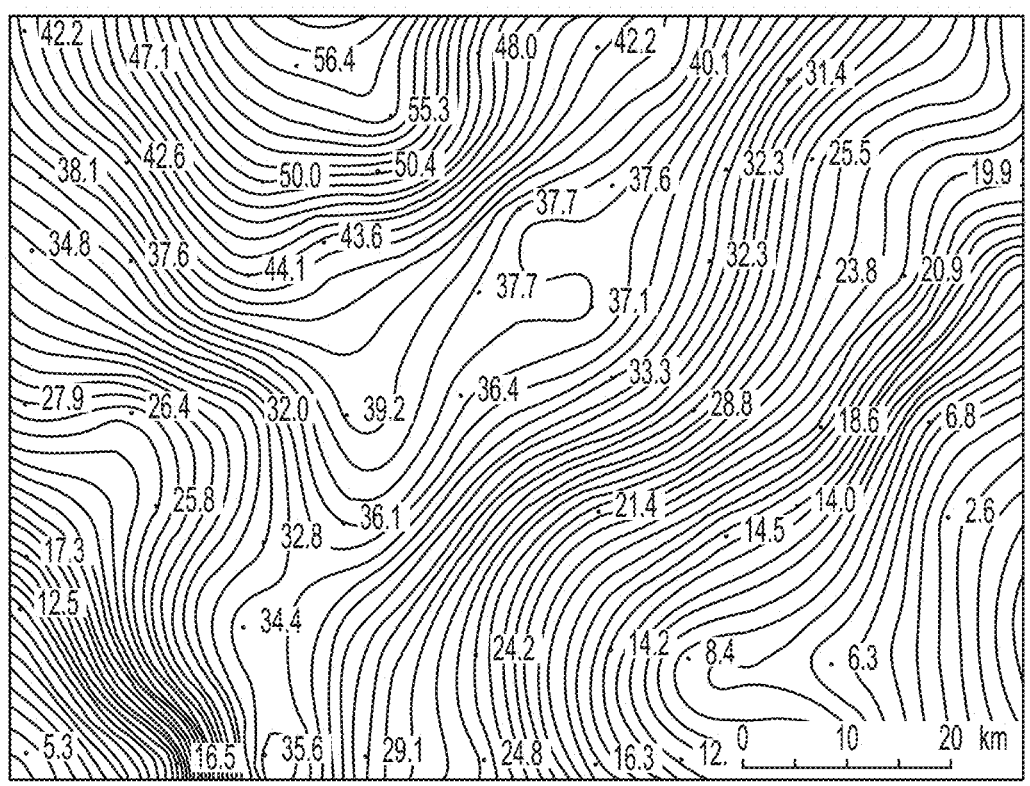
FIG. 14 is an example visualization of rendered contours according to various embodiments.

FIG. 14 is an example visualization 1400 of rendered contours according to various embodiments. Visualization 1400 includes contours and geographic elevation labels. A process for rendering visualizations such as visualization 1400 is presented below in reference to FIG. 15.

Figure 15:
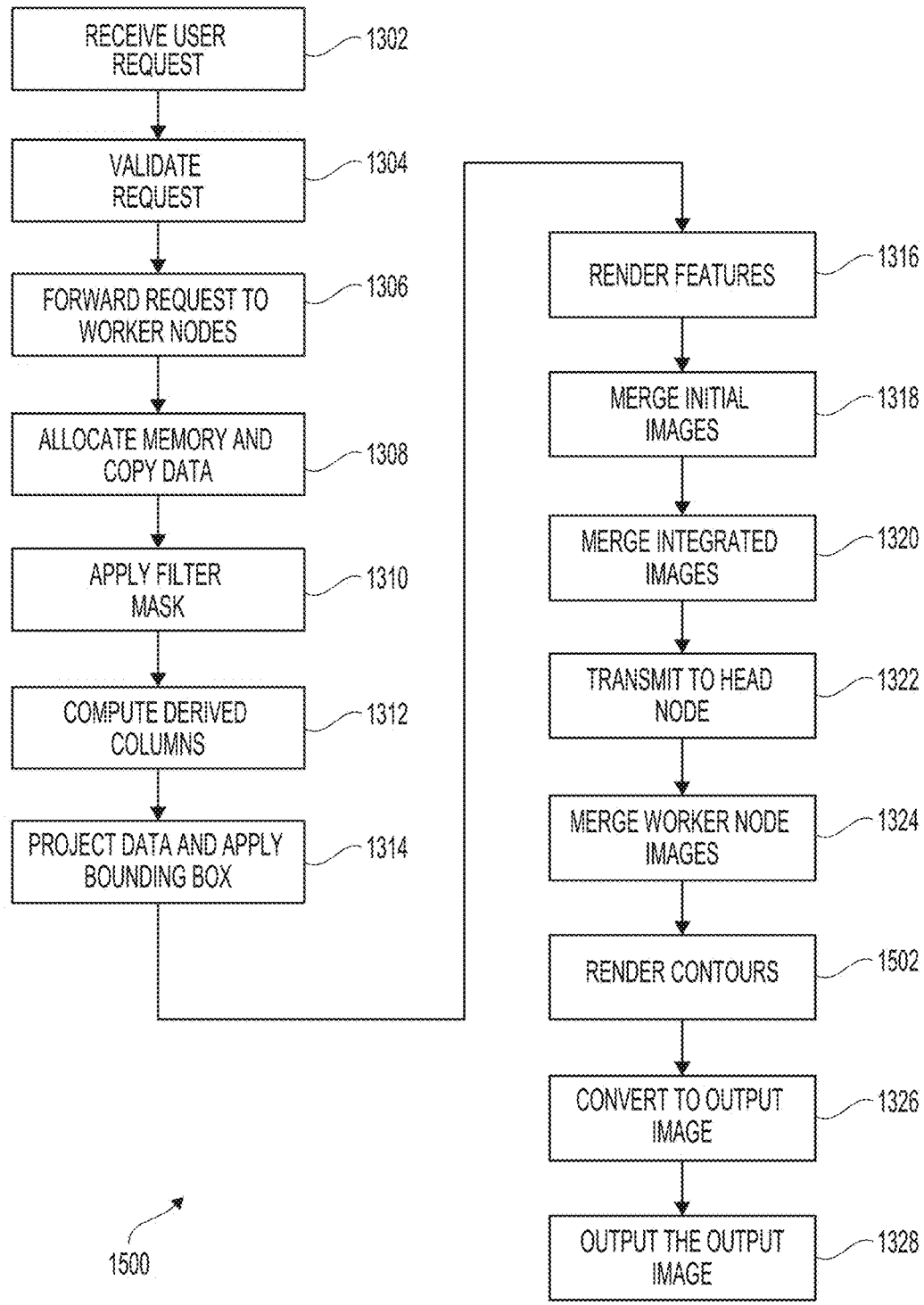
FIG. 15 is a flow diagram for a method of rendering contours according to various embodiments.

FIG. 15 is a flow diagram for a method 1500 of rendering contours according to various embodiments. Method 1500 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10. Further, method 1500 is similar to method 1300 of FIG. 13, except for the following differences.

At block 1302 for method 1500, the head node receives a user request that specifies the rendering type, namely, contour. The request may include any additional parameters as described above in reference to FIG. 13, and may also specify contour parameters, such as: contour level (i.e., the vertical distance of the surface represented by the underlying data that corresponds to the gap between adjacent contour lines), contour thickness, and contour color.

At block 1502 for method 1500, the head node calculates and imposes contour lines onto the final image. Contours are calculated based on the specified contour levels and/or the minimum and maximum values. Once calculated, the contours are rendered onto the final image by the head node.

Figure 16:
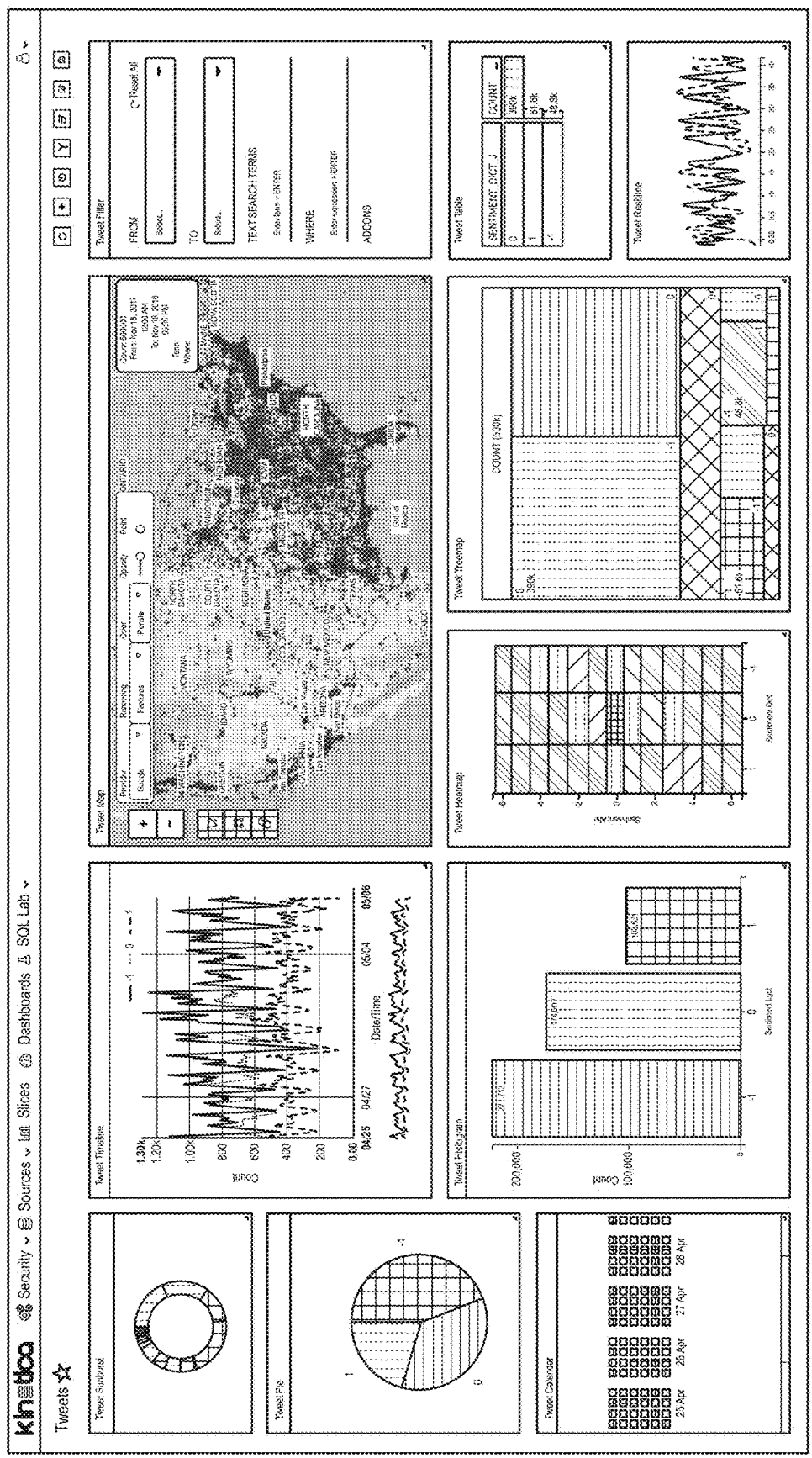
FIG. 16 is an example visualization of a rendered heatmap according to various embodiments.

FIG. 16 is an example visualization 1600 of a rendered heatmap according to various embodiments. The heatmap shades (and/or colors) rendered data depending on number of records per image location (e.g., per pixel). Thus, in general, heatmaps convey density at locations.

Figure 17:
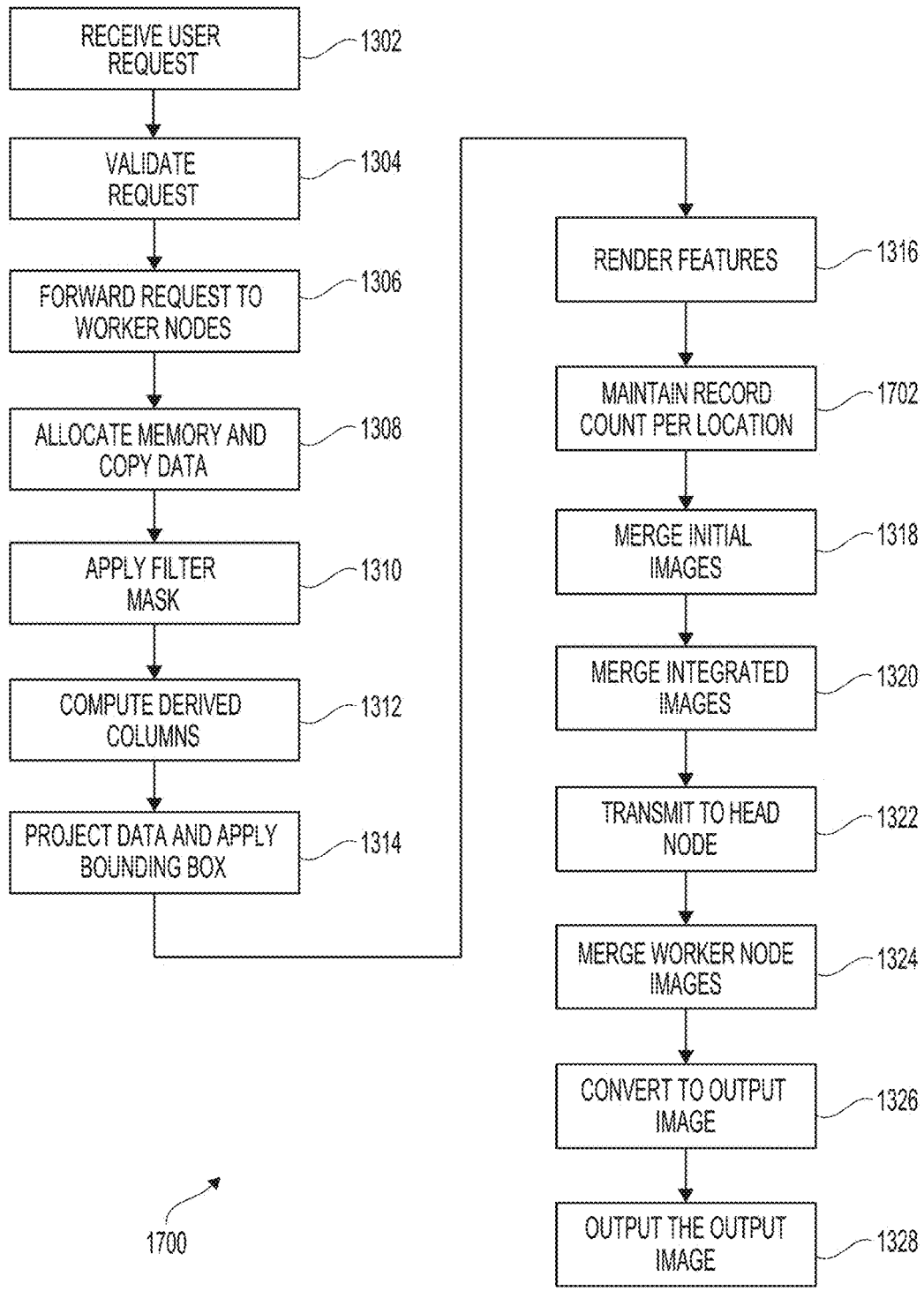
FIG. 17 is a flow diagram for a method of rendering a heatmap according to various embodiments.

FIG. 17 is a flow diagram for a method 1700 of rendering a heatmap according to various embodiments. Method 1700 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10. Further, method 1700 is similar to method 1300 of FIG. 13, except for the differences set forth presently.

At block 1302 for method 1700, the head node receives a user request that specifies the rendering type, namely, heat map. The request may include any additional parameters as described above in reference to FIG. 13, and may also specify heat map parameters, such as a series of colors to be used to denote the number of records per location.

Between blocks 1316 and 1318, method 1700 maintains a count, at each worker node, of the number of records that call for a rendering at each location (e.g., pixel) within the respective initial images. The counts may be stored in a separate column, a derived column, or an aggregate of a column used to accumulate the value into the allocated image.

At block 1320 for method 1700, the worker nodes also sum their record counts for their chunks. At block 1322 for method 1700, the worker nodes also transmit their counts to the head node, and at block 1324, the head node sums the record counts from among the worker nodes for each image location.

Further, method 1700 implements the heat map coloration based on the summed counts. The heat map coloration may be implemented on the final image between blocks 1324 and 1326, for example, prior to converting to the output image.

Figure 18:
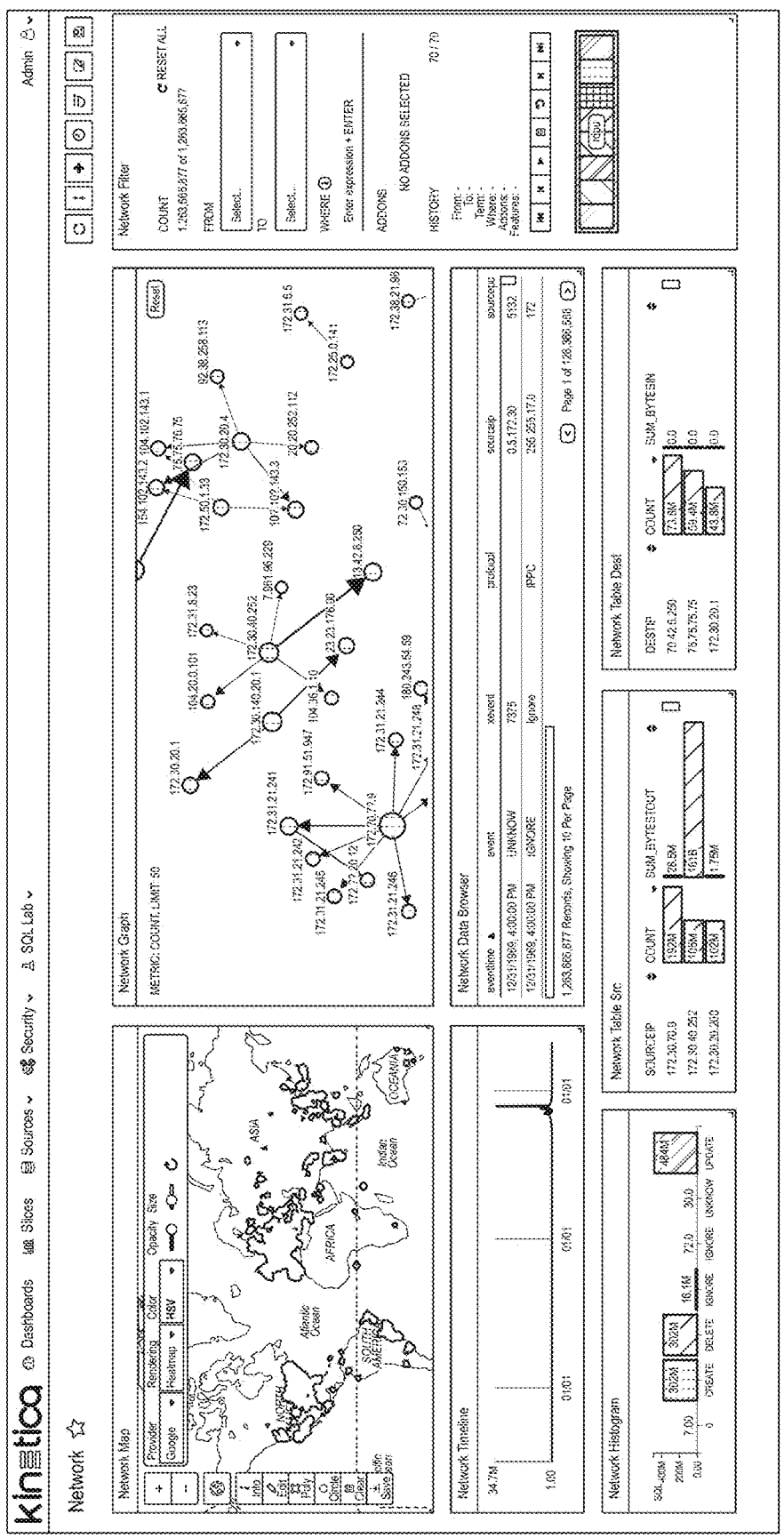
FIG. 18 is an example visualization of rendered IP communications according to various embodiments.

FIG. 18 is an example visualization 1800 of rendered IP communications according to various embodiments. Some embodiments utilize a native IP address object type with several optimized GPU accelerated functions for scanning and filtering network communication. Network communication between IP addresses are stored within the same data shard and a developer can choose the number of layers of communication to save within the same data shard. That is, IP communication data may be stored in same shards across a cluster of machines based on the number of cross communications between specific IP addresses.

The native IP address types may be rendered as a network graph, such as visualization 1800. A user can zoom in and out, and a new image is generated via the distributed architecture and pushed to a user's client (web browser) via, e.g., a web service. Users can click on a specific node and drill in to additional layers of sub-communication. A specific node can have a variety of metadata stored per packet of communication stored in the database. Different GPU accelerated sorting and plotting layout algorithms can be applied such as breadth first search and depth first search. These algorithms can also be used to traverse the graph.

Alternately, IP communication can be rendered as different types charts and graphs. Another example can be as a scatter plot, where the source IP address is on the x axis and target IP address is on the y axis. Clients can see communication of IP ranges and via client drilling to more fine grained analysis and visualizations.

Figure 19:
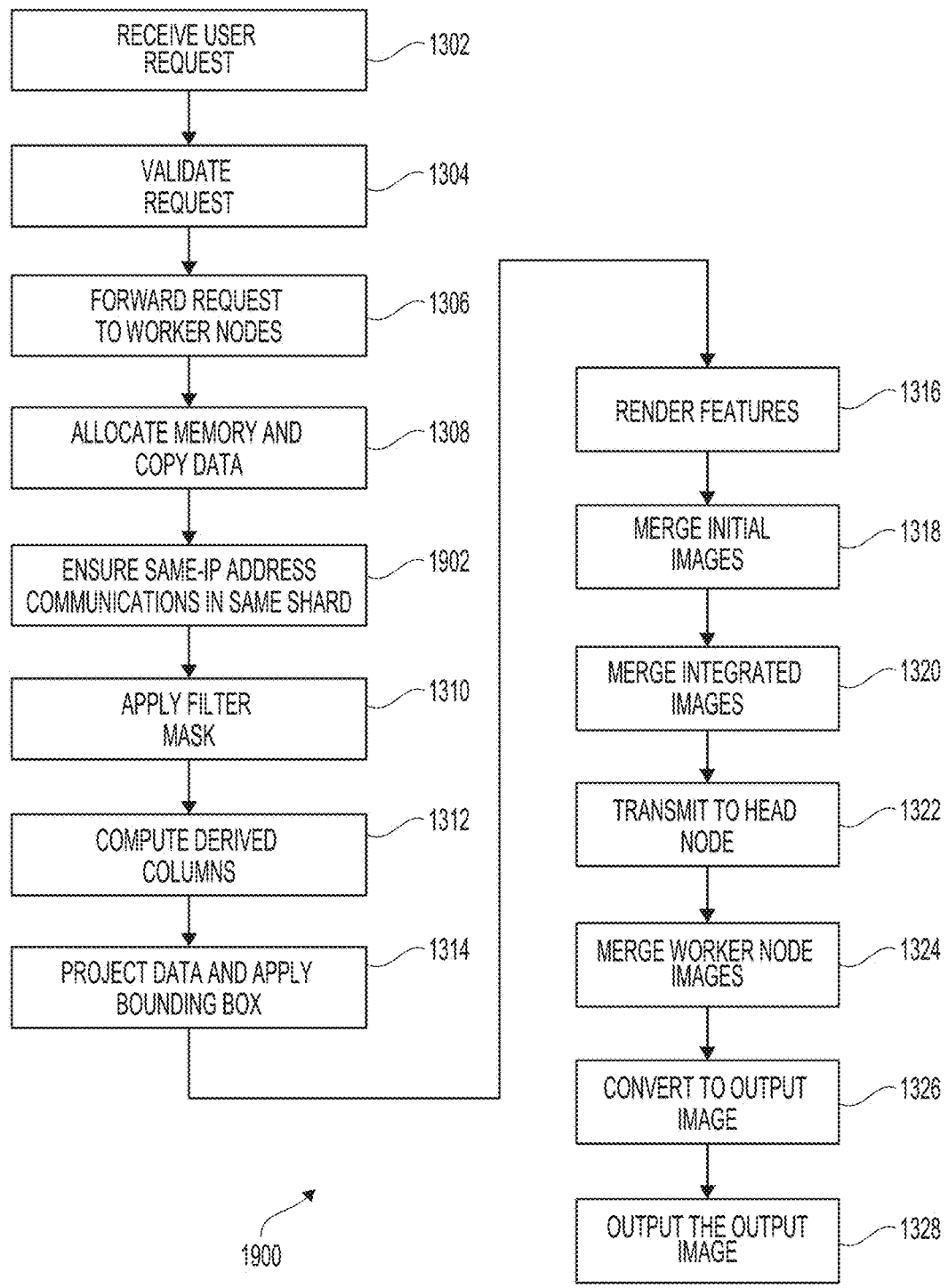
FIG. 19 is a flow diagram for a method of rendering IP communications according to various embodiments.

FIG. 19 is a flow diagram for a method 1900 of rendering IP communications according to various embodiments. Method 1300 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10. Further, method 1900 is similar to method 1300 of FIG. 13, except for the differences set forth presently.

At block 1302 for method 1900, the head node receives a user request that specifies the rendering type, namely, a rendering type suitable for IP address object types. Example such renderings include network graphs and scatterplots. The request may include any additional parameters as described above in reference to FIG. 13, and may also specify IP address parameters, such as how nodes and links are rendered. Parameters for points and lines are suitable for these renderings, respectively.

At block 1902, between blocks 1308 and 1310, the head node ensures that the data to be rendered is distributed such that communications between the same pair of IP addresses are stored at the same worker node. In other words, IP address object types are grouped and distributed so as to have communications between the same pair of addresses stored in the same place. A specific octet IP range may be stored in a specific shard (e.g., 172.12.10.1 through 172.12.10.255 in one shard, 192.x.y.z may be stored in a different shard).

Figure 20:
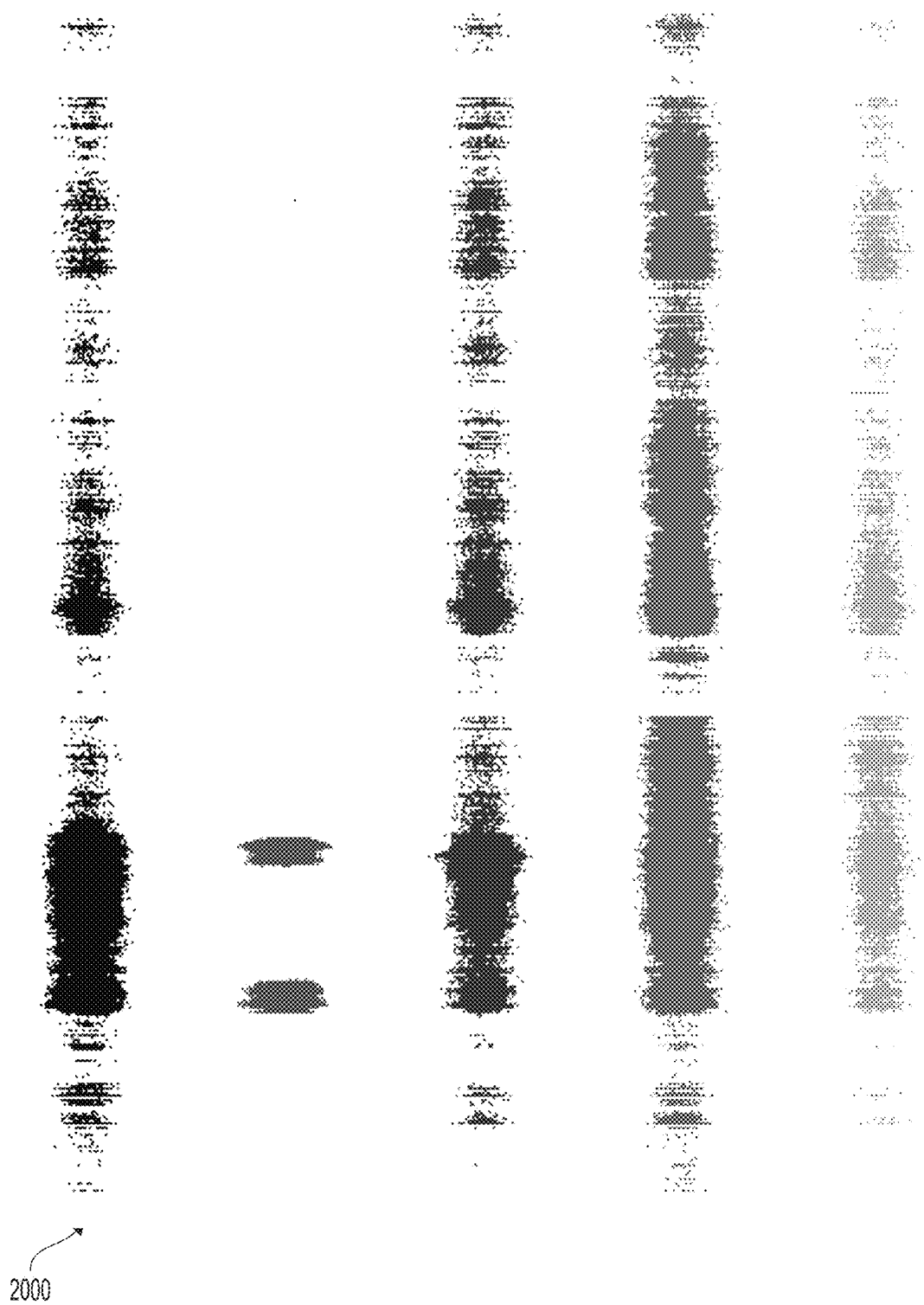
FIG. 20 is an example visualization of a rendered scatterplot according to various embodiments.

FIG. 20 is an example visualization 2000 of a rendered scatterplot according to various embodiments. The scatterplot may represent numeric or non-numeric entities on the x axis. For example, a scatterplot may be constructed for state-of-residence (a non-numeric entity) versus income, given a table consisting of all people in the US. The state may be represented on the x axis, which is a non-numeric column. The unique state values are calculated and optionally sorted either by the value itself or by some other aggregate, e.g., alphabetical order, or order by population size.

Figure 21:
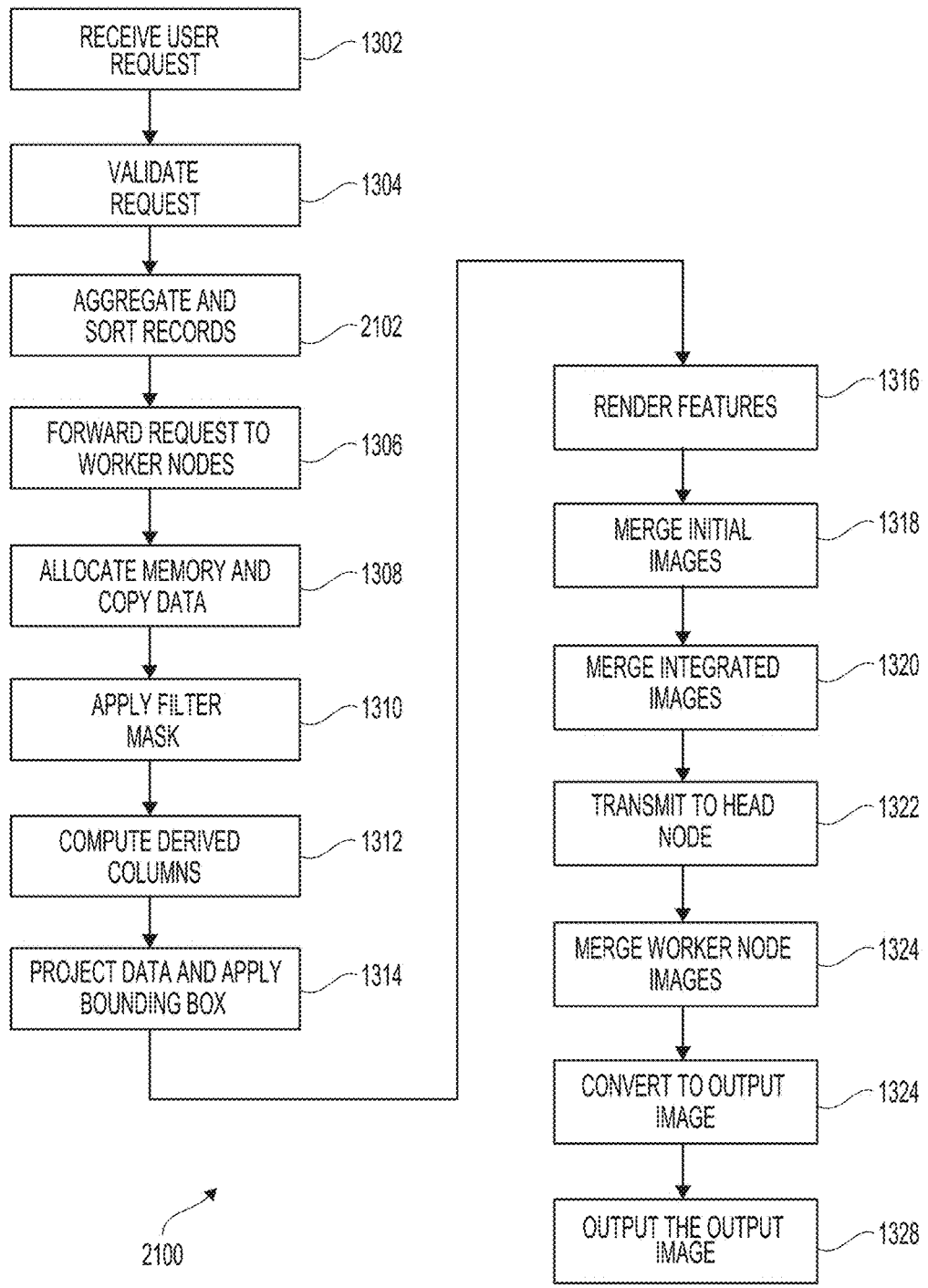
FIG. 21 is a flow diagram for a method of rendering a scatterplot according to various embodiments.

FIG. 21 is a flow diagram for a method 2100 of rendering a scatterplot according to various embodiments. Method 2000 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10. Further, method 2100 is similar to method 1300 of FIG. 13, except for the differences set forth presently.

At block 1302 for method 2100, the head node receives a user request that specifies the rendering type, namely, scatterplot. The request may include any additional parameters as described above in reference to FIG. 13, and may also specify scatterplot parameters, such as properties of the points to be rendered, e.g., size, color, shape, etc. Further, optional classbreak (described below) parameters may be specified at this block as well.

At block 2102 of method 2100, for non-numeric entities on the x axis, between blocks 1304 and 1306, the head node processes the data to assign integral numeric values to each non-numeric entity. The processing may include aggregating the records on the table to be visualized by the x column or y column values and evaluating an expression such as average, sum, or count of a column for each group in parallel across processes and partitions and chunks. The processing may include then sorting the aggregated groups by the values of the expression evaluated. The processing may include then assigning an integral value to each group (a non-numeric value) that will be used for scatter plotting non-numeric values. Finally, the processing may include updating the user's request with the sorted non-numeric values and integral values assigned, before forwarding the request to the head node per block 1306 for method 2100.

When rendering the data per block 1316 of method 2100, the worker nodes may implement a classbreak option for point color, point shape, and/or point size. Classbreaks are described in detail below in reference to FIGS. 22 and 23. Essentially, classbreaks permit users to quantize the rendered data into discrete classes such that each class is rendered differently, e.g., in a different color. When classbreak options are specified, the worker nodes each, in parallel and separately for each chunk, calculate a class break ID vector for point color, shape, or size class break, which contains an integer number associated with a class break group that each record belongs to. The worker nodes then pass the class break vectors calculated to a renderer together with X and Y values so that the renderer can draw each point with associated class break point styles.

Figure 22:
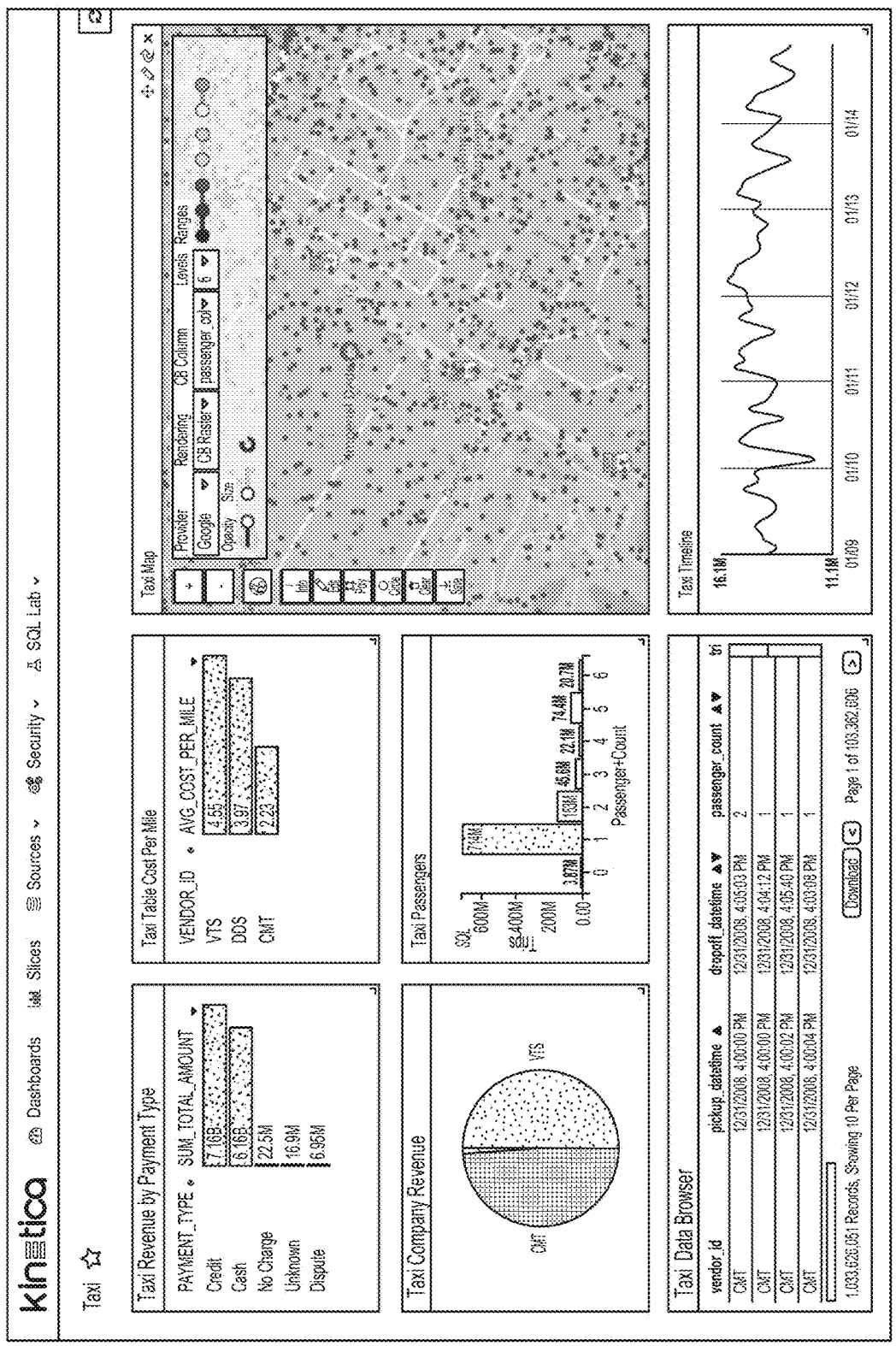
FIG. 22 is an example visualization of rendered classbreaks according to various embodiments.

FIG. 22 is an example visualization 2200 of rendered classbreaks according to various embodiments. As depicted, visualization 2200 shows classbreak-coded points representing taxi cab pickup locations in New York City, where the various colors represent number of passengers picked up.

In general, a classbreak provides an arbitrary integral number of divisions to a given table. Each division may be represented by a specific color (or other depiction). A table of all US states can be given a classbreak of an arbitrary count to depict population density or demographics data, for example.

Figure 23:
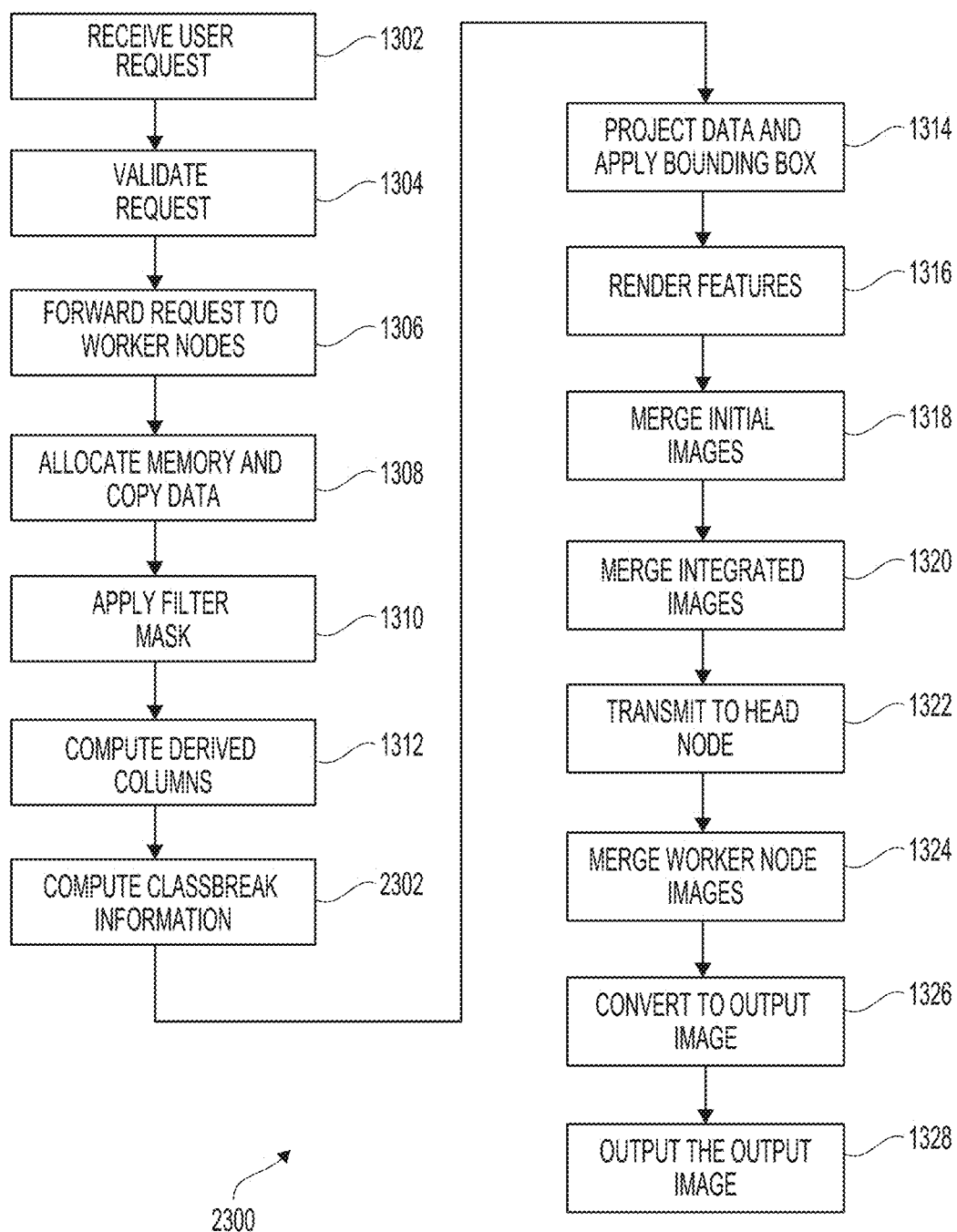
FIG. 23 is a flow diagram for a method of rendering classbreaks according to various embodiments.

FIG. 23 is a flow diagram for a method 2300 of rendering classbreaks according to various embodiments. Method 2300 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10. Further, method 2300 is similar to method 1300 of FIG. 13, except for the differences set forth presently.

At block 1302 for method 2300, the head node receives a user request that specifies the rendering type, namely, classbreak. The request may include any additional parameters as described above in reference to FIG. 13, and may also specify classbreak parameters, such as the column on which to apply the classbreaks, i.e., the "classbreak column", and definitions of the classes. Class definitions may be equality based, range based, or predicate based. Equality based classes may be defined such that each class consists of the records where the classbreak column matches a specific value. Range based classes may be defined such that each class consists of the records where the classbreak column falls with an specified range. Predicate based classes may be defined such that each class consists of the records where the classbreak columns pass a specified predicate filter. The class definitions may be stored in a separate column. Further, rendering parameters, such as color, size, shape, etc., for the points (or features) plotted for each class may be defined at this block.

At block 2302 of method 2300, between blocks 1312 and 1314, the worker nodes compute class information for each record. The class is computed by matching data in the classbreak column for each record to the classbreak definitions. When rendering per block 1316 of method 2300, the renderer applies the class rendering parameters to the record data according to the class determined by the matching.

Figure 24:
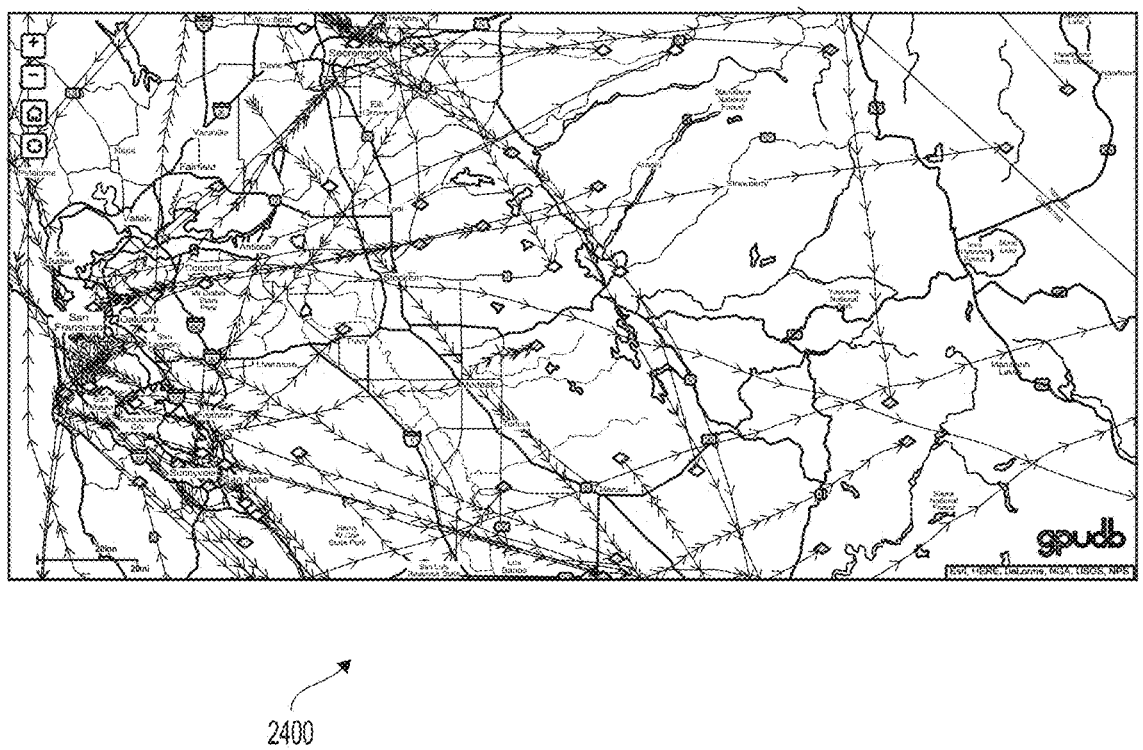
FIG. 24 is an example visualization of rendered tracks according to various embodiments.

FIG. 24 is an example visualization 2400 of rendered tracks according to various embodiments. Some embodiments provide a track object type, for tracking entities over time. A track data type is a time series data object type tracking an entity across time at specific time intervals. It can have a location, e.g., (x, y) or (longitude, latitude), but does not need to. Track object types with location can be used for flights, ships, railroads, people, or mobile devices, for example. Track object types without location can be used for stock prices, news from a newspaper, tweets without a location from a person, etc. If a track object type has a location, it can be rendered as a heat map or as fine grained feature vectors, for example. Further, if it has a location, it can be sorted based on time to derived location. Connecting the series of points that describe a track object that includes location data describes the path a specific entity has traveled through with reference to time and any other attributes collected at each data point in the track path. Each unique track has a distinct Globally Unique Identifier ("GUID"). A track can have a variety of column attributes giving various metadata about the track. Each track point can have its own separate distinct metadata, apart from its other data, or it can be the same.

The track object type can be rendered in a fine grained manner with specific shapes and colors defining different aspects of the entity across time. A track can be rendered as two-dimensional or, if it has an altitude element for example, three-dimensional. Multicore accelerated functions can be executed such as the intersection function (e.g., draw a polygon, database calculates all points of tracks that have intersected that polygon, find all the connecting tracks) and the technology renders the data on the fly as a picture of a video. The video can be created in any number of way to show dynamic queries on the fly. This can be a series of PNGs based on time or a H.264 encoded video, for example.

In rendering arrow feature mode, some embodiments have the capability to render a line across all the points that form part of that track. Some embodiments have the ability to render individual transition points as a specific color and/or with specific symbol. As shown in visualization 2200, the transition points are round and the track head (last point received and stored in the database) is rendered as an arrowhead.

Once obtained, a user can click on a track image, and some embodiments will interpolate where the user clicked on their screen relative to the location on the map, render the specific tracks containing that specific point, and highlight all the points that make up the entire track. Zooming into the map, some embodiments renderer images that fit the zoom extent of the user's map extent. Zooming closer and closer in, finer location of the track points are rendered. Users can specify a number of different parameters for the visualization of a track's points and lines and can toggle its color, shape, size, font, skew, quality of resolution to the screen among other items.

Figure 25:
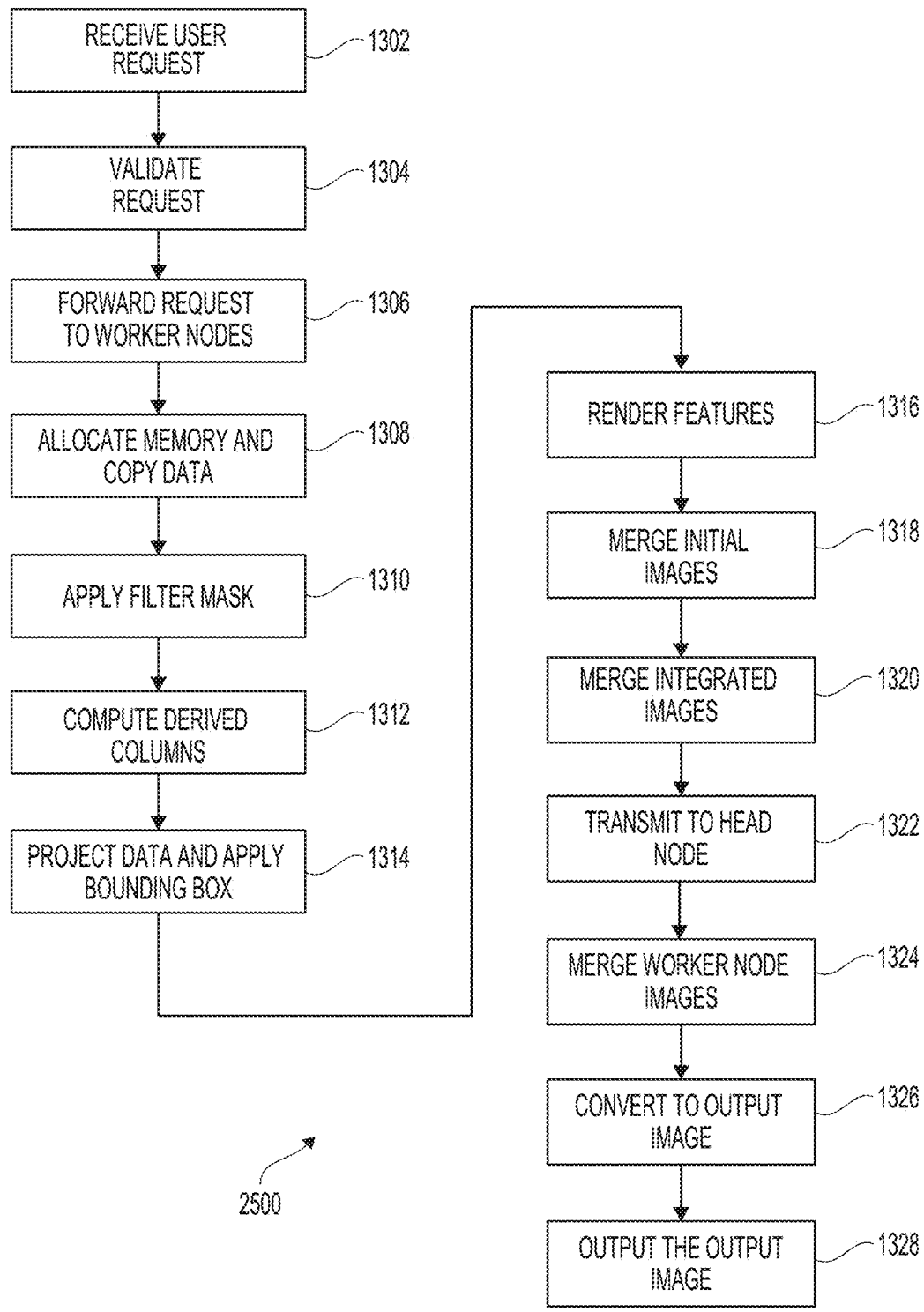
FIG. 25 is a flow diagram for a method of rendering tracks according to various embodiments.

FIG. 25 is a flow diagram for a method 2500 of rendering tracks according to various embodiments. Method 1300 may be implemented using the hardware disclosed herein, e.g., as shown and described in reference to FIGS. 1, 2 and 11, and/or employing the calculation and processing techniques disclosed herein, e.g., as shown and described in reference to FIGS. 3-10. Further, method 2500 is similar to method 1300 of FIG. 13, except for the differences set forth below.

At block 1302 for method 2500, the head node receives a user request that specifies the rendering type, namely, track. The request may include any additional parameters as described above in reference to FIG. 13, and may also specify track parameters, such as parameters for the features to be used to render the track transition points and track heads.

At block 1308 for method 2500, in ingesting and storing a track data type, all the points or features of that specific data are stored in the same data shard and not distributed like other data types within the database. Thus, the copying ensures that the data for a single track object type are stored in the same shard.

V. PRE-PROCESSING GEO-SPATIAL SHAPE DATA

Some embodiments pre-processing geo-spatial shape data, e.g., in Well-Known Text ("WKT") format, for adaptive large-scale geo-spatial feature rendering. In general, when visualizing massive amount of shape data into a limited screen space with a resolution of up to 4K×2K pixels, a complex polygonal shape is often drawn as a few pixels. All details of its features may be in-visible or imperceptible. The computational load to render millions or billions of complex shapes is extremely heavy, so that users may experience a long latency to see a visualized image of such a large geo-spatial data. However, an interactive visualization of large geo-spatial data is essential for users to find an area of interest and to close up to the area to examine the detailed geo-spatial features and to extract meaningful insights.

To support large scale geo-spatial visualization interactively, some embodiments pre-generate level of details representations ("LODs") of geo-spatial shape data while they are being ingested into the database or loaded from persist (disk storage) to memory. In a distant view where complex shapes are represented by only a few pixels in the visualization result, low LOD representations such as a point or low-res bitmap image may be rendered instead of the full details of the shapes. This significantly increases the rendering performance of massive shape data and reduces memory usage to allow users to interactively migrate the full dataset. As users find areas of interest and close up those areas, mid or high LODs are rendered. While the renderer has to process more data per shape to display high LODs, the number of shapes to be rendered are reduced so that the renderer can sustain fast rendering performance.

According to some embodiments, the generated LODs may be stored in a spatially partitioned quadtree. Each tree node may have the maximum resolution to be rendered without aliasing so that the level/nodes that fits given viewport and rendering resolution may be readily determined. Some embodiments may have a global tree at the head node; other embodiments may distribute trees across chunks.

To generate a quad tree, if the bounds of the WKT data set are known, the quad tree may be built for the whole dataset (or for a chunk of the dataset). In case the bounds are unknown ahead of time, the world of data to be rendered may be split into a fixed number of geospatial regions, and a quadtree may be built for each region.

Each tree node may be mapped to a rectangular geospatial region and split into four sub-regions to which four children are mapped. A maximum rendering resolution may be predefined for each node. By projecting the bounding box of a shape to the geospatial region at the maximum rendering resolution of a tree node, some embodiments calculate the maximum pixel resolution of the shape when it is rendered as a part of the tree node.

According to the maximum pixel resolution of a shape, some embodiments simplify the shape or add it as-is to a quadtree node. For example, if the resolution is at or below 2×2, some embodiments may simplify the shape as a point, at or below 16×16 as a bitmap image. If it has an elongated bounding box, it may be simplified as a line. If the shape is added as-is, the quadtree generation may be done for the shape. If is simplified, some embodiments pass the shape to a child node containing it and repeat the same process with the child.

Some embodiments institute a cap for the height of the tree (i.e., a maximum number of levels). Once all shapes are added, the leaf nodes may have the original (not simplified) shapes only.

To avoid the same representation being duplicated across levels, a pointer or reference to a LOD or shape may be stored in multiple tree nodes across different levels. A tree node may consist of arrays of points, lines, bitmaps and triangles, references to points, lines, bitmaps and triangles in other tree nodes and references to polygons in external arrays.

For two-dimensional polygonal shapes with full details to be rendered fast, some embodiments triangulate them during quadtree generation. The polygons not simplified at lower levels (the level of the root node is zero) may be triangulated first because they have higher chance to be visualized with the full details. Some embodiments defer triangulation of polygons at or close to leaf nodes so that they are triangulated on demand at render/query time. This way, such embodiments can trade off the rendering performance and memory usage for storing pre-generated triangles.

Some embodiments render view-dependent LODs. Given the viewport and rendering resolution from a visualization request, some embodiments calculate the requested rendering resolution of a geospatial region within the viewport. (For example, if the rendering resolution for the whole viewport is 1000×1000 pixels, and four quadtree nodes are fit into the viewport, each node may be rendered at 500×500 pixels.) To do so, such embodiments traverse the quadtree nodes (from the root) intersected by the viewport and stop traversal and render LODs in the nodes when the max resolution of the node is higher than the requested rendering resolution of the geospatial region mapped to the node. LODs and shapes referenced (not directly stored) in a node may be gathered into temporary buffers before they are passed to a renderer. With such a LOD rendering scheme, the total number of non-simplified polygons (highest LOD) rendered by a single request may be limited. So the polygons in a leaf (or close to leaf) quadtree node may be triangulated on demand and rendered sustaining interactive system response time.

VI. CONCLUSION

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

What is claimed is:

1. A method of rendering database data in visualized form using a distributed computer system comprising a plurality of networked worker nodes each comprising a graphics processing unit (GPU), a sink node, and a head node, the method comprising:
   receiving, at the head node, a request to render data in visualized form, the request comprising an identification of computer readable data to be rendered and a rendering type;
   forwarding, by the head node, the request to each of the plurality of worker nodes, wherein each of the plurality of worker nodes comprises at least one respective shard of the data to be rendered;
   processing, in parallel, by at least one GPU of each of the plurality of worker nodes, and based on the request, chunks of respective shards of data to be rendered by at least rendering the data to be rendered to form initial images;
   merging, in parallel, by each of the plurality of worker nodes and for each of a plurality of shards, initial images formed by the processing within respective shards, to form a plurality of integrated images;
   merging, in parallel, by each of the plurality of worker nodes, respective integrated images to form a plurality of worker node images;
   transmitting, by each of the plurality of worker nodes, respective worker node images to the sink node;
   merging, by the sink node, the worker node images to form a final image;
   converting the final image to an output image; and
   providing the output image to the user.

2. The method of claim 1, wherein the rendering type comprises a classbreak rendering type;
   wherein the processing further comprises matching at least a portion of the data to be rendered to classbreak information;
   wherein the rendering comprises rendering based on the matching.

3. The method of claim 1,
   wherein the rendering type comprises a heat map rendering type;
   wherein the processing further comprises:

projecting the data to be rendered into a geographic projection space;

applying a bounding box specified by the request to the data to be rendered; and maintaining a count of records per image location; and wherein the rendering comprises rendering based on the count of records per image location.

4. The method of claim 1, wherein the rendering type comprises a contour rendering type; and wherein the processing further comprises:

projecting the data to be rendered into a geographic projection space; and applying a bounding box specified by the request to the data to be rendered;

the method further comprising rendering contours on the final image.

5. The method of claim 1, wherein the rendering type comprises a scatter plot rendering type; and wherein the method further comprises:

aggregating the plurality of records into a plurality of groups according to values of a selected coordinate; and sorting records within each of the plurality of groups.

6. The method of claim 1, wherein the rendering type comprises an internet protocol (IP) rendering type;

the method further comprising storing representations of communications between the same IP addresses in the same shard;

wherein the processing further comprises applying a bounding box specified by the request to the data to be rendered.

7. The method of claim 1, wherein the rendering type comprises a track rendering type;

the method further comprising storing representations of portions of the same track datum in the same shard;

wherein the processing further comprises applying a bounding box specified by the request to the data to be rendered.

8. The method of claim 1, wherein the rendering type comprises a feature rendering type, wherein the feature rendering type comprises at least one of point feature rendering type, line feature rendering type, polygon feature rendering type, label feature rendering type, or arrow rendering type;

wherein the processing further comprises:

projecting the data to be rendered into a geographic projection space; and applying a bounding box specified by the request to the data to be rendered; and wherein the rendering comprises rendering a selected feature type.

9. The method of claim 8, wherein the feature rendering type comprises a label rendering type; and wherein the rendering comprises rendering both geometric objects and text.

10. The method of claim 1, further comprising:

pre-generating level-of-detail representations of geo-spatial shape data for the data to be rendered; and storing the level-of-detail representations in an electronically-stored quad tree.

11. A distributed computer system for rendering database data in visualized form, the distributed computer system comprising:

a head node comprising an electronic server computer, the head node communicatively coupled to a computer network and configured to receive a request to render data in visualized form, the request comprising an identification of computer readable data to be rendered and a rendering type;

a plurality of networked worker nodes each comprising a graphics processing unit (GPU), communicatively coupled to the computer network, and configured to receive the request from the head node, wherein each of the plurality of worker nodes comprises electronic memory configured to store at least one respective shard of the data to be rendered, and wherein each of the worker nodes is further configured to process, in parallel, by at least one GPU of each of the plurality of worker nodes, and based on the request, chunks of respective shards of data to be rendered by rendering the data to be rendered to form initial images, wherein the plurality of networked worker nodes are further configured to merge, in parallel, for each of a plurality of shards, initial images formed by the processing within respective shards, to form a plurality of integrated images, and to merge, in parallel, respective integrated images to form a plurality of worker node images; and a sink node communicatively coupled to the plurality of networked worker nodes and configured to receive worker node images from the plurality of networked worker nodes, merge the worker node images to form a final image, convert the final image to an output image, and provide the output image to the user.

12. The system of claim 11, wherein the rendering type comprises a classbreak rendering type;

wherein each of the worker nodes is further configured to match at least a portion of the data to be rendered to classbreak information;

wherein the rendering comprises rendering based on a result of matching.

13. The system of claim 11, wherein the rendering type comprises a heat map rendering type;

wherein the processing further comprises:

projecting the data to be rendered into a geographic projection space;

applying a bounding box specified by the request to the data to be rendered; and maintaining a count of records per image location; and wherein the rendering comprises rendering based on the count of records per image location.

14. The system of claim 11, wherein the rendering type comprises a contour rendering type;

wherein the processing further comprises projecting the data to be rendered into a geographic projection space, and applying a bounding box specified by the request to the data to be rendered; and wherein the sink node is further configured to render contours on the final image.

15. The system of claim 11, wherein the rendering type comprises a scatter plot rendering type; and wherein the head node is further configured to aggregate the plurality of records into a plurality of groups according to values of a selected coordinate and sort records within each of the plurality of groups.

16. The system of claim 11, wherein the rendering type comprises an internet protocol (IP) rendering type;

wherein the plurality of networked worker nodes are further configured to store representations of communications between the same IP addresses in the same shard; and wherein the processing further comprises applying a bounding box specified by the request to the data to be rendered.

17. The system of claim 11, wherein the rendering type comprises a track rendering type;

wherein the plurality of networked worker nodes are further configured to store representations of portions of the same track datum in the same shard;

wherein the processing further comprises applying a bounding box specified by the request to the data to be rendered.

18. The system of claim 11, wherein the rendering type comprises a feature rendering type, wherein the feature rendering type comprises at least one of point feature rendering type, line feature rendering type, polygon feature rendering type, label feature rendering type, or arrow rendering type;

wherein the processing further comprises projecting the data to be rendered into a geographic projection space and applying a bounding box specified by the request to the data to be rendered; and wherein the rendering comprises rendering a selected feature type.

19. The system of claim 18, wherein the feature rendering type comprises a label rendering type; and wherein the rendering comprises rendering both geometric objects and text.

20. The system of claim 11, further configured to pre-generate level-of-detail representations of geo-spatial shape data for the data to be rendered and store the level-of-detail representations in an electronically-stored quad tree.

* * * * *